(12) United States Patent
Stettner et al.

(10) Patent No.: US 9,834,209 B2
(45) Date of Patent: *Dec. 5, 2017

(54) AUTOMOTIVE AUXILIARY LADAR SENSOR

(71) Applicant: CONTINENTAL ADVANCED LIDAR SOLUTIONS US, LLC., Carpinteria, CA (US)

(72) Inventors: Roger Stettner, Santa Barbara, CA (US); Patrick Gilliland, Santa Barbara, CA (US); Andrew Duerner, Goleta, CA (US)

(73) Assignee: Continental Advanced Lidar Solutions US, LLC, Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/721,221

(22) Filed: May 26, 2015

(65) Prior Publication Data
US 2015/0258990 A1   Sep. 17, 2015

Related U.S. Application Data

(63) Continuation of application No. 13/901,914, filed on May 24, 2013, now Pat. No. 9,069,080.

(51) Int. Cl.
*G06F 17/10* (2006.01)
*B60W 30/08* (2012.01)
(Continued)

(52) U.S. Cl.
CPC .............. *B60W 30/08* (2013.01); *B60T 7/22* (2013.01); *B62D 15/0265* (2013.01);
(Continued)

(58) Field of Classification Search
CPC ..... B60Q 1/0023; G01S 17/023; G01S 17/89; G01S 7/481; G01S 7/4818; G01S 7/489;
(Continued)

(56) References Cited

U.S. PATENT DOCUMENTS 5,629,524 A * 5/1997 Stettner ................ G01T 1/2018
250/370.09
5,696,577 A * 12/1997 Stettner ................ G01S 7/4863
250/332

(Continued)

FOREIGN PATENT DOCUMENTS

EP         0566027 A1   10/1993
WO    2012165957 A1   12/2012

OTHER PUBLICATIONS

European Search Report transmitted Mar. 28, 2017 for corresponding European application No. 1618407.3.

*Primary Examiner* — Gertrude Arthur Jeanglaud

(57) ABSTRACT

A vehicle and ladar sensor assembly system is proposed which makes use of forward mounted long range ladar sensors and short range ladar sensors mounted in auxiliary lamps to identify obstacles and to identify potential collisions with the vehicle. A low cost assembly is developed which can be easily mounted within a body panel cutout of a vehicle, and which connects to the vehicle electrical and computer systems through the vehicle wiring harness. The vehicle has a digital processor which interprets 3D data received from the ladar sensor assembly, and which is in control of the vehicle subsystems for steering, braking, acceleration, and suspension. The digital processor onboard the vehicle makes use of the 3D data and the vehicle control subsystems to avoid collisions and steer a best path.

27 Claims, 15 Drawing Sheets

(51) Int. Cl.
  *G01S 17/02* (2006.01)
  *G01S 17/89* (2006.01)
  *G01S 17/93* (2006.01)
  *G01S 7/481* (2006.01)
  *G01S 7/489* (2006.01)
  *B60T 7/22* (2006.01)
  *B62D 15/02* (2006.01)
  *B60Q 1/00* (2006.01)

(52) U.S. Cl.
  CPC .............. *G01S 7/481* (2013.01); *G01S 7/489* (2013.01); *G01S 7/4813* (2013.01); *G01S 7/4818* (2013.01); *G01S 17/023* (2013.01); *G01S 17/89* (2013.01); *G01S 17/936* (2013.01); *B60Q 1/0023* (2013.01); *B60W 2420/52* (2013.01)

(58) Field of Classification Search
  CPC .......... B62D 15/0265; B60W 2420/52; B60W 30/08; B60T 7/22
  USPC .......... 701/1, 37, 41, 70, 301; 340/988, 901, 340/903; 356/4.01
  See application file for complete search history.

(56) References Cited

U.S. PATENT DOCUMENTS

| | | | |
|---|---|---|---|
| 6,674,412 | B1 | 1/2004 | Schmidt et al. |
| 7,061,372 | B2 * | 6/2006 | Gunderson ........... G01S 13/931 340/435 |
| 9,069,080 | B2 * | 6/2015 | Stettner ................ B60Q 1/0023 |
| 2009/0122141 | A1 | 5/2009 | Nakamura et al. |
| 2012/0044093 | A1 | 2/2012 | Pala |
| 2012/0081915 | A1 | 4/2012 | Foote et al. |
| 2012/0154785 | A1 | 6/2012 | Gilliland et al. |
| 2012/0261516 | A1 | 10/2012 | Gilliland et al. |
| 2013/0128257 | A1 | 5/2013 | Stettner et al. |

* cited by examiner

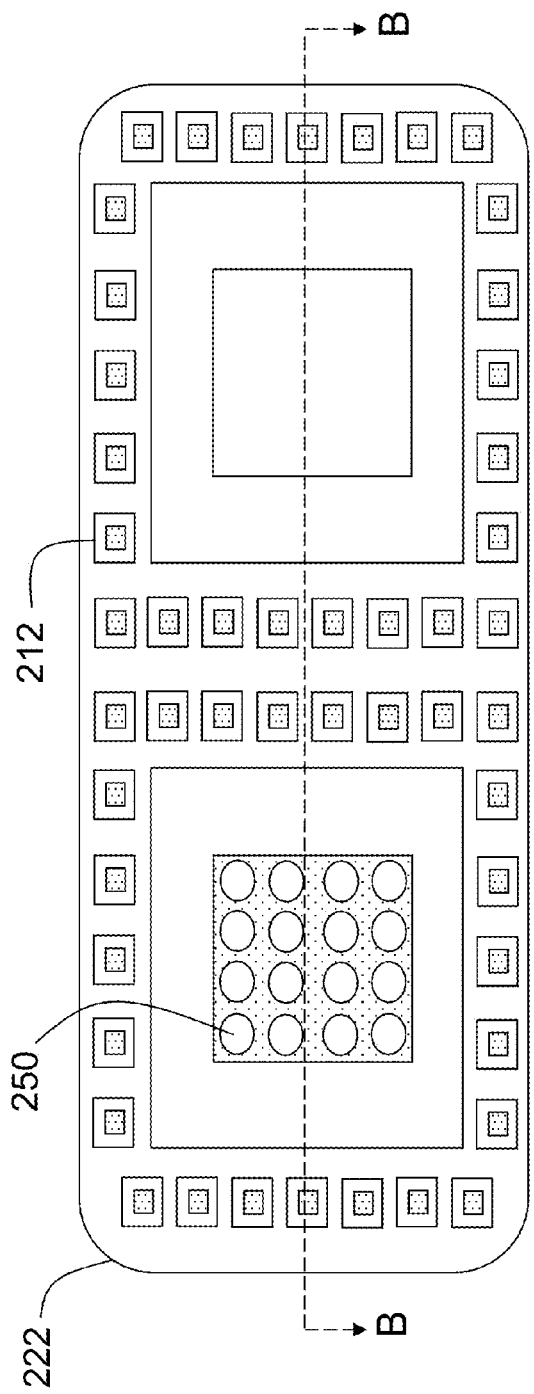
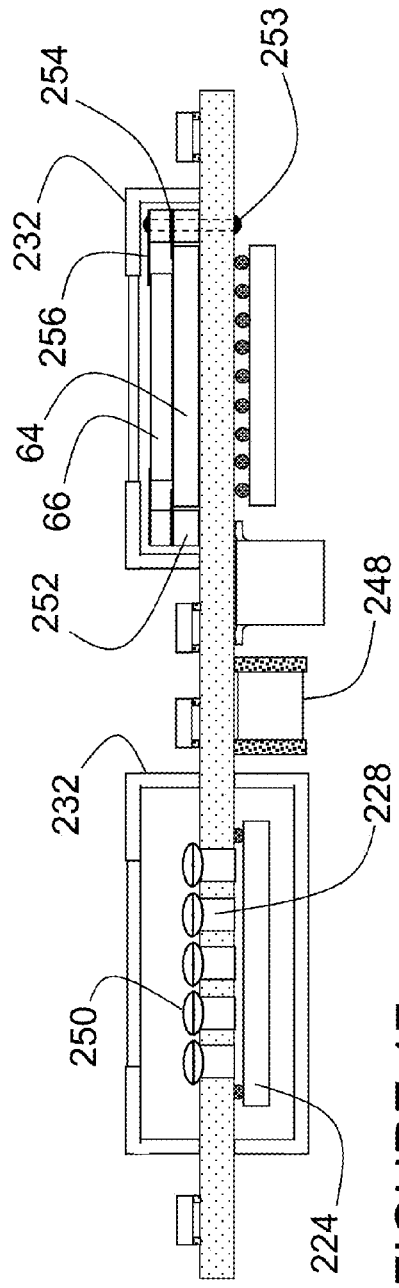
FIGURE 16.
FIGURE 17.

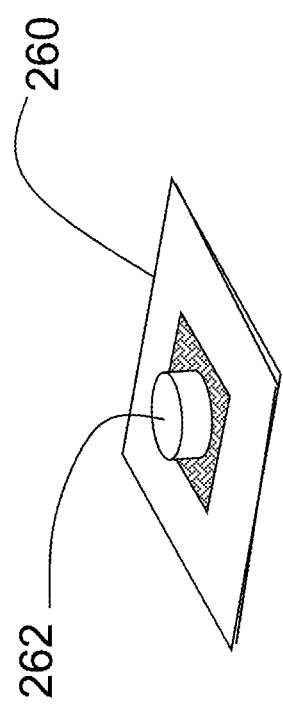

AUTOMOTIVE AUXILIARY LADAR SENSOR

REFERENCE TO RELATED APPLICATIONS

This application is a continuation of U.S. patent application Ser. No. 13/901,914 filed on May 24, 2013 entitled AUTOMOTIVE AUXILIARY LADAR SENSOR, having a common assignee with the present application, the disclosure of which is incorporated herein by reference.

BACKGROUND

Field

The embodiments disclosed herein relate generally to 3-D image generation and the identification of objects, tracking of objects, road hazard avoidance, and collision avoidance in short range automotive applications and more particularly to a ladar sensor assembly having a laser transmitter, laser sensor and digital processor integrated in an envelope inserted into a vehicle body panel.

References to Related Art

The 3-D imaging technology disclosed in Stettner et al, U.S. Pat. Nos. 5,446,529, 6,133,989 and 6,414,746 provides with a single pulse of tight, typically pulsed laser light, ail the information of a conventional 2-D picture along with the third dimensional coordinates; it furnishes the 3-D coordinates of everything in its field of view. This use is typically referred to as flash 3-D imaging in analogy with ordinary digital 2-D cameras using flash attachments for a self contained source of light. As with ordinary 2-D digital cameras, the light is focused by a lens on the focal plane of the LADAR sensor, which contains an array of pixels called a focal plane array (FPA). In the case of a LADAR sensor these pixels are "smart" and can collect data which enables a processor to calculate the round-trip time of flight of the laser pulse to reflective features on the object of interest. Each smart pixel also collects data associated with the returning laser pulse shape and magnitude. One value of these flash LADAR sensors, as opposed to competing designs in which one or more pixels is scanned over the field of view, is the elimination of the precision mechanical scanner, which is costly, high maintenance and typically large and heavy. The pixels in the focal plane of a flash LADAR sensor are automatically, registered due to their permanent positions within the array. Further, by capturing a frame of data as opposed to one or a few pixels with one laser pulse, the data rate is greatly increased while weight and volume are reduced. Because each frame of data is captured from the reflection of a short duration laser pulse, moving objects or surfaces of stationary objects may be captured from a moving platform without blurring or distortion.

The driver and passengers of an automobile are exposed to dangers from other vehicles and a number of road hazards. In avoiding side impacts, grazing contact, or low speed impacts in the driver blind spots a sensor is needed which can be installed in multiple locations on a vehicle at low cost.

Many systems have been proposed to meet the challenge of using optical imaging and video cameras in a vehicle system to create 3-D maps of scenes and models of solid objects, and to use the 3-D database to navigate, steer, and avoid collisions with stationary or moving objects. Stereo systems, holographic capture systems, and those which acquire shape from motion, have all been proposed and in some cases demonstrated, but what is lacking is a system with the capability of rapidly capturing 3-D images of objects and roadway features in the path of a moving vehicle, or travelling on an intersecting path, and which controls and adapts the host vehicle so as to avoid collisions and road hazards, and steer the best path.

It is therefore desirable to provide, a low cost side and/or rear short range, or proximity sensor to enable such a collision avoidance system with full 360 degree capability.

SUMMARY OF THE INVENTION

The embodiments disclosed herein provide a ladar sensor assembly and vehicle wherein the vehicle has a cutout in a body panel at the periphery of the vehicle with a shape adapted to receive a mating retention feature on the ladar sensor assembly. The vehicle further has a digital processor, a wiring harness and a first connector attached at a terminus of said wiring harness. The ladar sensor assembly is mounted to the vehicle and includes an envelope enclosing a ladar sensor, the envelope having at least one transparent section and also having at least one retention feature. A second connector is adapted to mate with the first connector of the wiring harness. The ladar sensor assembly also includes receiving optics and a laser transmitter with a modulated laser light output and a diffusing optic for illuminating a scene in a field of view of the ladar sensor. A two dimensional array of light sensitive detectors is positioned at a focal plane of the receiving optics, each of the light sensitive detectors having an output producing an electrical response signal from a reflected portion of the modulated laser light output. A readout integrated circuit with multiple unit cell electrical circuits is also included, each of the unit cell electrical circuits having an input connected to one of the light sensitive detector outputs and each unit cell electrical circuit having an electrical response signal demodulator. A range measuring circuit is connected to an output of the electrical response signal demodulator to a reference signal providing a zero range reference for the range measuring circuit. A detector bias circuit is connected to at least one voltage distribution grid of the array of light sensitive detectors. The digital processor is connected to receive an output from the range measuring circuit and a temperature stabilized frequency reference is connected through the digital processor to provide clocking signals.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 16 is a plan view of a second embodiment of a low cost auxiliary ladar sensor assembly showing optional features which may be installed in the same basic package as shown in FIG. 14;

FIG. 17 is a side view of a section along line AA of the device described in FIG. 16, and showing enhanced details of the features of the low cost auxiliary ladar sensor assembly;

DETAILED DESCRIPTION

Figure 1:
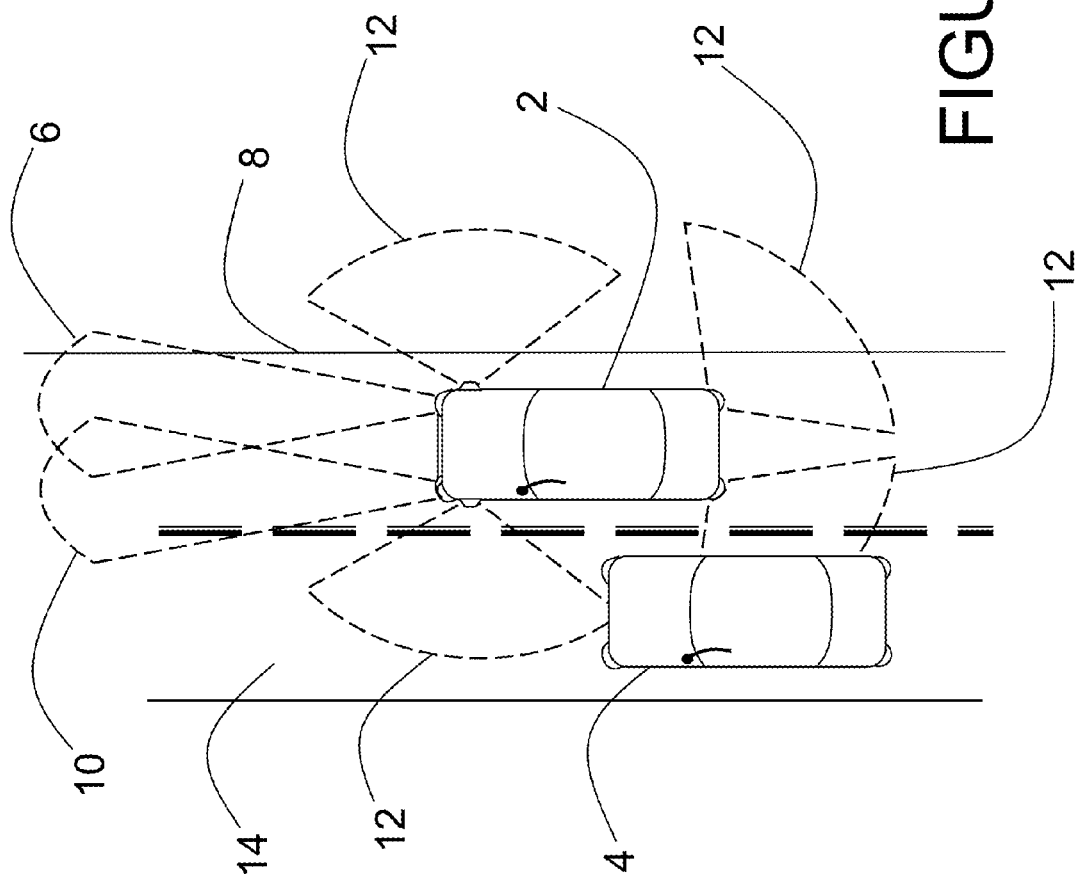
FIG. 1 is a diagram of a typical collision threat scenario with a second vehicle approaching a first vehicle from behind and left, typically a blind spot for the driver of the first vehicle.

This application contains new subject matter related to previous U.S. Pat. Nos. 5,696,577, 6,133,989, 5,629,524, 6,414,746, 6,362,482, D463,383, and U.S. patent application Ser. No. 10/066,340 filed on Jan. 31, 2002 and published as US 2002/0117340 A1, the disclosures of which are incorporated herein by reference.

The embodiments disclosed herein enable a system for collision avoidance, object and obstacle recognition and avoidance, and ride and steering control improvements. The benefits are realized through the use of a 3-D imaging facility, comprising a vehicle mounted ladar system with an object detection and recognition capability, a steering, braking, and accelerator control system, and a ride and suspension modification system. The vehicle mounted ladar system may comprise a number of side mounted, rear mounted, or forward looking ladar sensors connected to a central ladar system controller which synthesizes the available data from each of the independent ladar sensors into a composite 3D map of the immediate area in a full 360 degree arc surrounding the vehicle. In a preferred embodiment, conventional 2D still images or video sequences may be used to improve the quality of 3D solid models and scene maps. The multiple ladar sensors each have an illuminating laser module which may incorporate a semiconductor laser with a modulated laser light output, or a pulsed solid state laser, and a diffusing optic for illuminating a scene in the field of view of the auxiliary/proximity ladar sensor. Each ladar sensor also comprises a receiver module featuring a two dimensional array of light sensitive detectors positioned at a focal plane of a light collecting and focusing assembly (Focal Plane Array). The ladar sensor may be incorporated into a headlight, taillight, or other auxiliary lamp assembly. The ladar sensor may also be part of a backup light, rearview mirror assembly, or mounted behind an opening in a bumper or grill assembly, or may be high mounted on a vehicle door or roof support, or other vehicle position.

In the case of a potential side or rear impact, it is important to detect the possible impact, and to relay imagery of the potentially colliding object of interest. Additionally, while backing up, or maneuvering at low speed in parking lots, near curbs, or pedestrian traffic, it is useful to have the advantages of multiple, low cost auxiliary ladar sensors mounted strategically on the periphery of the host vehicle. It is therefore desirable to provide a system which uses a plurality of low cost and compact auxiliary flash LADAR sensors having a shorter range and wider field of view than the main, forward looking vehicle LADAR sensors. The auxiliary short range LADAR sensors and main, long range LADAR sensors operate together to generate 3D data describing objects and obstacles on a closing path with the host vehicle.

The present invention is drawn toward providing a low cost auxiliary ladar sensor designed to be used as a side or rear sensor in a vehicle mounted ladar imaging system. The 3D images derived from the auxiliary ladar sensor may reveal objects in the path of the host vehicle, or on an intersecting path, and a maneuver may be calculated to avoid a collision or to reduce peak forces between vehicles, or to crash as safely as possible. The system may also adapt the suspension of the vehicle so as to maintain traction on an irregular road surface, or to avoid dangerous obstacles in the roadway. Each vehicular ladar imaging system typically consists of multiple vehicle mounted ladar sensors, divided into two categories. The first category of vehicular ladar sensor is the long range, or primary sensor, typically mounted in a forward location of the vehicle and oriented in the direction of high speed travel so as to sweep out the path of the vehicle in the direction of travel. The second category of sensor is a shorter range, or auxiliary sensor, typically mounted on the vehicle as a rear or side sensor, and oriented so as to cover the driver blind spots at minimum, and optimally, a full 360 degree coverage around the periphery of the vehicle. These auxiliary sensors must be low cost to allow for multiple installations on the vehicle, and thus to facilitate safe and controlled driving in reverse gear, lane changing, and turning, etc. Each ladar sensor may have a system control processor with frequency reference and inertial reference, a system memory, a pulsed laser transmitter, transmit optics, receive optics, an array of light detecting elements positioned at a focal plane of the receive optics, a detector bias converter for supplying bias voltage to the light detecting focal plane array, a readout integrated circuit, analog-to-digital converter circuits for producing digital image data from the analog readout IC outputs, a data reduction processor for adjusting and correcting the image data, and an object tracking processor for segregating, isolating, identifying, and tracking features and objects in the corrected image database. When paired with an intelligent vehicle system controller with vehicle, steering, braking, and suspension controls, substantial reductions in impact events, and less frequent and severe damage to the occupants and the vehicle is expected. Each pixel in a focal plane array (EPA) of the preferred ladar sensor converts impinging laser light into an electronic signal whose magnitude is sampled in time and stored in memory within the pixel. Each pixel also uses a clock to time the samples being taken in response to the captured reflection of the laser tight from a target surface. The ladar sensor typically incorporates a hybrid assembly of focal plane array and readout integrated circuit, and the readout IC is arranged as an array of unit cell electrical circuits, and each unit cell is arranged to be in an array of identical spacing and order as the mating focal plane array. The ladar sensor in a preferred embodiment is capable of working in a flash mode as described above, or in a multi-pulse mode, or in a pulsed continuous-wave mode as the situation dictates. The collision avoidance and navigation system incorporating the ladar sensor has a number of features which enable hill 3D object modeling and tracking, as well as scene enhancements derived from the merging of 2D and 3D data bases and managing of both 3D ladar sensors and conventional 2D video cameras. Each of the light sensitive detectors of the FPA has an output producing an electrical response signal from a reflected portion of the laser light output. The electrical response signals are connected to a readout integrated circuit (ROW) with a corresponding array of unit cell electrical circuits. Each of the unit cell electrical circuits has an input connected to one of the light sensitive detector outputs, an electrical response signal demodulator, and a range measuring circuit connected to an output of the electrical response signal demodulator. The demodulator may be a voltage sampler and analog shift register for storing sequential samples of the electrical response signals, or it may comprise a mixer, integrator, or matched filter. The demodulation may also take place external to the readout integrated circuit, by a fast digital processor operating on a sequence of digitized samples from each pixel. The fast digital processor may employ algorithms which utilize weighted sums of sequential analog samples, or use fast Fourier transforms, convolution, integration, differentiation, curve fitting, or other digital processes on the digitized analog samples of the electrical response. The fast digital processor may also employ algorithms which isolate or segment the roadway from other objects and objects from each other. Such objects may be automobiles, bicycles, motorcycles, trucks, persons, animals, walls, signs, road obstructions etc. These algorithms may compute position and orientation, as well as object velocity. Objects, their orientation, position and velocity may be transferred to a central computer for further processing and decision making. Each unit cell circuit has the ability to preserve the shape of the returned ladar pulse, and to make inferences about the shape of the surface within a pixel boundary as seen projected at a distance from the focal plane array, based on the shape of the reflected light pulse. The range measuring circuit is further connected to a reference signal providing a zero range reference for the modulated laser light output. The individual ladar sensor may also incorporate a detector bias circuit connected to a voltage distribution grid of the detector array and a temperature stabilized frequency reference.

FIG. 1 depicts a first embodiment of the collision avoidance system installed on a first vehicle 2 involved in a collision threat scenario with a second vehicle 4, which is overtaking the first vehicle in the blind spot of the driver of the first vehicle 2. The forward radiation pattern 6 of a long range ladar sensor embedded in a first headlight assembly of first vehicle 2 is shown by dashed lines where it sweeps the roadway ahead of the passenger side of the first vehicle 2, and the right edge of the roadway 8. The forward radiation pattern 10 of a long range ladar sensor embedded in a second headlight assembly of first vehicle 2 is shown by dashed lines where it sweeps the roadway ahead of the passenger side of the first vehicle 2, and at least part of the adjacent lane of traffic 14. The radiation pattern 12 of an auxiliary ladar sensor embedded in a tamp assembly is shown projecting radially from the left rear corner of first vehicle 2, and overlapping a part of second vehicle 4. Short range radiation patterns 12 are also shown emanating from auxiliary lamp assemblies at the other three corners of first vehicle 2. The auxiliary ladar sensor in this scenario provides object data and scene data to central processing unit aboard vehicle 2. The central processing unit aboard vehicle 2 then acts to avoid a grazing collision with second vehicle 4, by sending commands to the vehicle 2 control systems, in this case applying brakes and steering to the right of the roadway, allowing second vehicle 2 to pass unimpeded. Alternatively, the central processing unit may simply notify the operator of the vehicle through a graphical display, audio warning, or tactile signal through a transducer embedded in the steering wheel.

Figure 2:
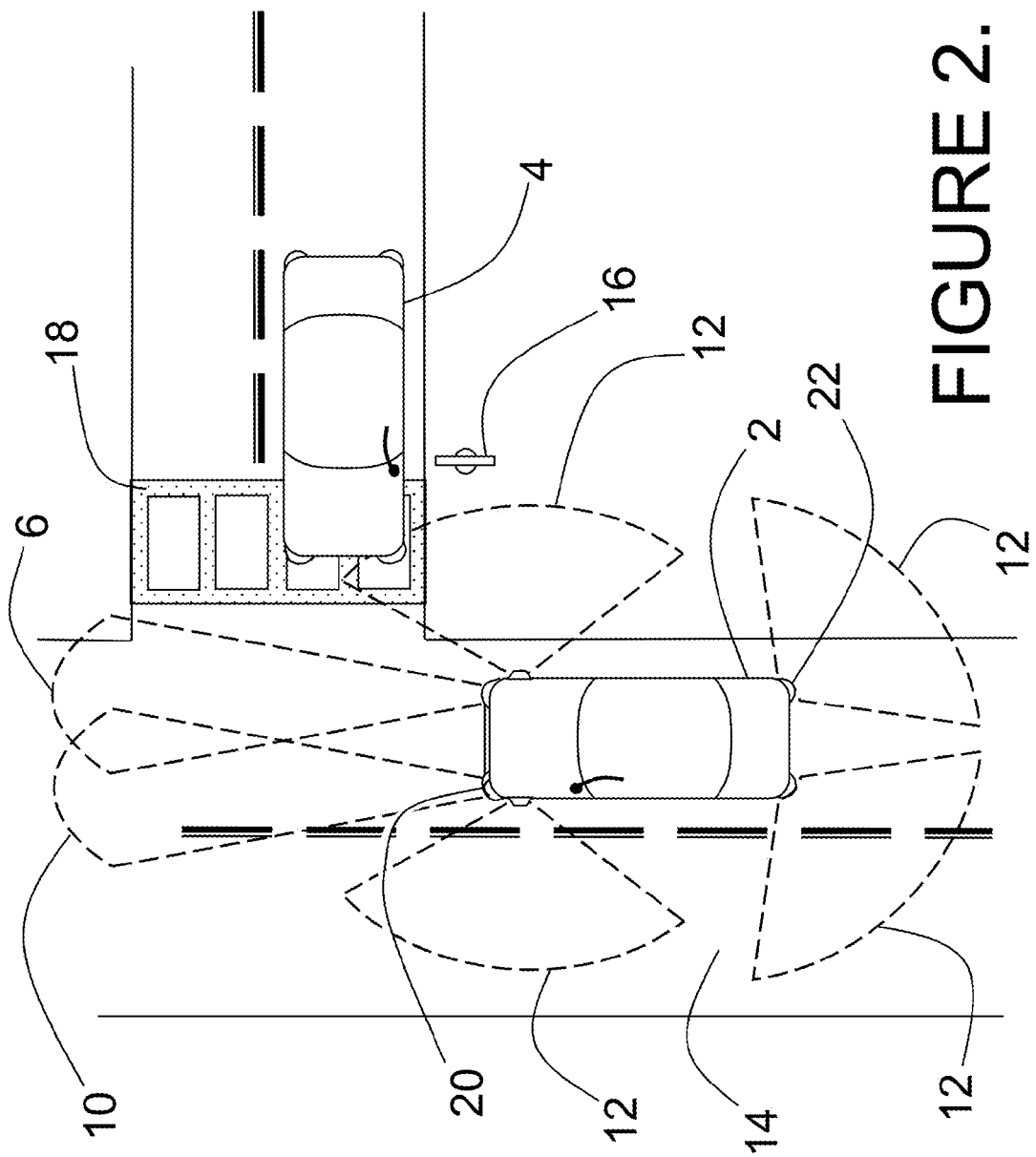
FIG. 2 is a diagram of a lateral collision threat wherein a second vehicle has stopped past the limit line at the stop sign, or may be slowly rolling through the limit line as the first vehicle approaches.

FIG. 2 shows a second collision threat scenario. The situation where first vehicle 2 is approaching an intersection with second vehicle 4 stopped at the intersection. In this case, second vehicle 4 appears to have overshot the stop limit line adjacent to stop sign 16 and has rolled into the crosswalk 18 (shaded area), and in some cases, may still be rolling or sliding forward. This scenario could easily, evolve on a rain-slickened or icy roadway, where second vehicle 4 might have difficulty stopping in time. Second vehicle 4 may alternatively be emerging from a blind alley perpendicular and to the right of the roadway edge 14. A headlight assembly 20 containing a long range ladar sensor is shown on first vehicle 2. Also shown is an auxiliary lamp assembly 22 containing a short range ladar sensor typically positioned at the four corners of first vehicle 2. The first vehicle 2 has collected scene and object data concerning second vehicle 4, and the onboard central processing unit has analyzed the combined data and determined an impact is possible. An array of sensor data, including long range and short range ladar sensors, video/still cameras, GPS or relative position references (to be described in greater detail subsequently), is analyzed by the central processor, and commands are sent to the vehicle 2 control systems, in this case, steering to make an emergency lane change, and braking to reduce the closing speed. It is also possible that second vehicle 4 by means of a side sensor could detect the danger and react defensively as well.

Figure 3:
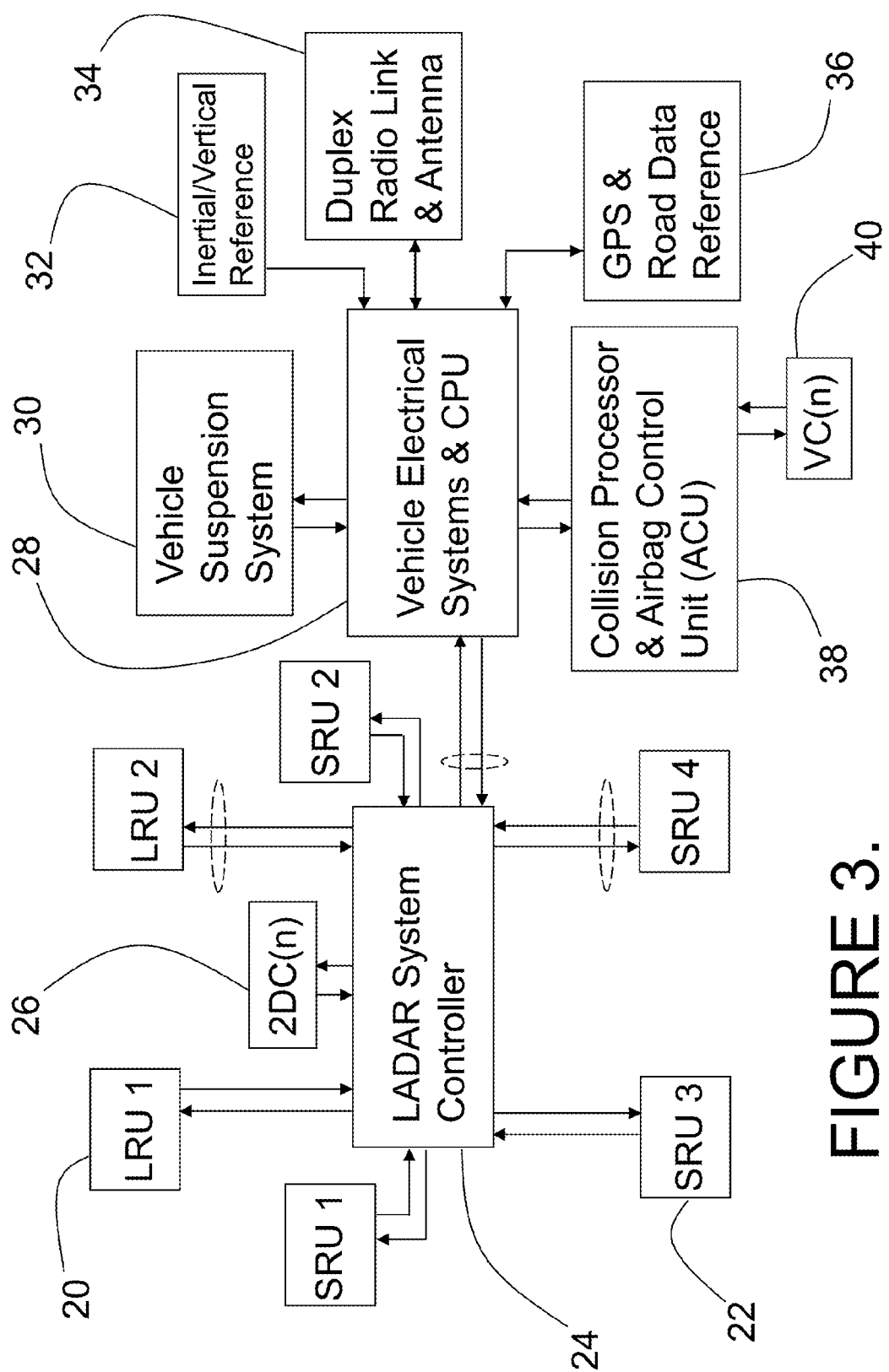
FIG. 3 is a system block diagram showing the individual ladar sensors and the vehicle electrical systems including interconnect, related vehicle subsystems, and vehicle central processors.

FIG. 3 shows a system block diagram showing the relationship and connections of the major functional blocks of the vehicle ladar sensor system. A ladar system controller 24 communicates with all of the ladar sensors mounted on the vehicle. In a typical installation, two long range units, LRU 1 and LRU 2 20 connect to ladar system controller 24 through a set of bidirectional electrical connections. The electrical connections may also have an optical waveguide and optical transmitters and receivers to transfer data, control, and status signals bidirectionally between long range ladar sensors 20 to ladar system controller 24. Ladar system controller 24 also communicates with the 4 short range units, SRU 1, SRU 2, SRU3, and SRU4 22, each through a set of bidirectional electrical connections. The electrical connections may also have an optical waveguide and optical transmitters and receivers to transfer data, control, and status signals bidirectionally between short range ladar sensors 22 and ladar system controller 24. Each of the ladar system ladars may include data processors to reduce the processing load on the central processors 24 and 28; for example, developing the point cloud and isolating/segmenting objects in the field of view and object speed from the point cloud. A number (n) of optional visible light 2D still or video cameras 40 also connect to the vehicle collision processor 38 and produce scene data complementary to the 3D data generated by the various ladar sensors mounted to the vehicle. The 2D still or video cameras 40 may also operate at infrared wavelengths as opposed to visible wavelengths typical in the preferred embodiment. The fields of view of the 2D still or video cameras 40 are designed to overlap the fields of view of the ladar sensors (20 and 22) installed on the vehicle 2. Bidirectional electrical connections also serve to transfer 3D data maps, status, and control signals between ladar system controller 24 and the vehicle electrical systems and central processing unit (CPU) 28. At the core of the vehicle, an electronic brain may control all functioning of the vehicle 2, and typically controls all other subsystems and co-processors. The electronic brain, or central processing unit (CPU 28) is here lumped together with the basic electrical systems of the vehicle, including battery, headlights, wiring harness, etc. The vehicle suspension system 30 receives control commands and returns status through bidirectional electrical connections, and is capable of modifying the ride height, spring rate, and damping rate of each of the vehicle wheels independently. An inertial reference 32 also has a vertical reference, or gravity sensor as an input to the CPU 28. A global positioning reference 36 may also be connected to the vehicle CPU 28. The GPS reference 36 may also have a database of ail available roads and conditions in the area which may be updated periodically through a wireless link. A duplex radio link 34 may also be connected to CPU 28, and communicate with other vehicles 4 in close range and which may be involved in a future impact, and may also receive road data, weather conditions, and other information important to the operations of the vehicle 2 from a central road conditions database. The vehicle 2 may also provide updates to the central road conditions database via radio uplink 34, allowing the central road conditions database to be augmented by any and all vehicles 2 which are equipped with ladar sensors and a radio link 34. A collision processor and airbag control unit 38 connects bidirectionally to CPU 28 as well, receiving inputs from a number of accelerometers, brake sensors, wheel rotational sensors, ladar sensors, etc. ACU 38 makes decisions on the timing and deployment of airbags and other restraints.

Figure 4:
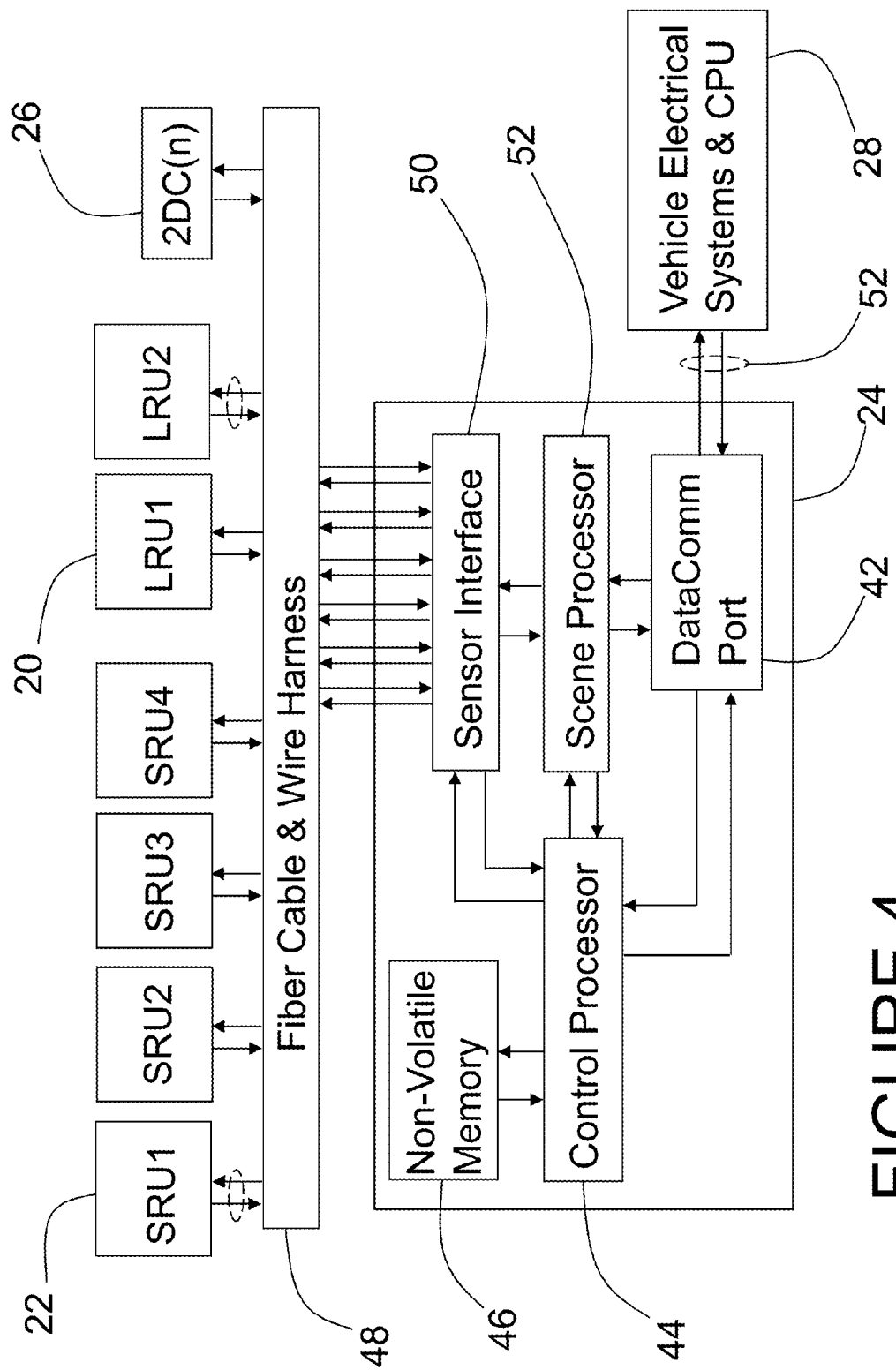
FIG. 4 is a block diagram showing internal details of the LADAR system controller of FIG. 3, and the external interconnections with individual ladar sensors mounted on the vehicle, as well as the host vehicle electrical systems.

FIG. 4 is a block diagram showing additional details of the ladar system controller 24, and the interconnections with the cooperating systems of vehicle 2. The ladar system controller 24 comprises a sensor interface 50, which transmits commands to the short range ladar sensors SRU1-4 22, and to the long range ladar sensors LRU1 and LRU2 20. A fiber cable and wire harness 48 provides the physical media for the transfer of the commands from the sensor interface 50 to the various ladar sensors. 3D data and status signals are returned from the various ladar sensors to sensor interface 50 through fiber cable and wire harness 48. Likewise, command signals are sent to a number (n) of 2D cameras 26, and status and image data are returned from the 2D cameras via wire harness 48 to ladar system controller 24. Each long range sensor unit 20 connects through a set of bidirectional connections which logically include the transmitters and receivers within each long range sensor unit 20, the physical media of fiber cable and wire harness 48, and the transmitters and receivers of sensor interface 50. Each short range sensor unit 22 connects through a set of bidirectional connections which logically include the transmitters and receivers within each short range sensor unit 22, the physical media of fiber cable and wire harness 48, and the transmitters and receivers of sensor interface 50. Sensor interface 50 receives digital logic levels from scene processor 52 and control processor 44 and conditions these signals for transmission over fiber cable and wire harness 48 to the various ladar sensors installed on the vehicle 2. Sensor interface 50 may provide amplification, level adjustment, digital-to-analog conversion, and electrical-to-optical signal conversion for outbound signals from control processor 44 and scene processor 52 intended for one or more of the various ladar sensors or 2D cameras installed on the vehicle 2. Conversely, for inbound signals, sensor interface 50 may provide amplification, level shifting, analog-to-digital conversion, and optical-to-electrical conversion for 3D or 2D data and status signals sent from any one of the various ladar sensors or 2D cameras installed on the vehicle 2 and then provides these received and/or converted signals to control processor 44 and scene processor 52 as digital signals. The sensor interface 50, including D/A and A/D signal converters, may reside completely or in part on a readout integrated circuit (64 in FIG. 5). Scene processor 52 combines the 3D frames received from each of the operational ladar sensors into a composite 3D map of the entire space directly in front of and surrounding the vehicle 2 and may also merge the 3D map with 2D image data received from a number (n) of 2D still or video cameras 26 to provide enhanced resolution, color, and contrast. The addition of conventional 2D still or video cameras 26 provide the system with enhanced capability for object identification. Complete 3D maps of the area surrounding the vehicle 2 are best enabled when the auxiliary, short range sensors 22 are installed. In a preferred embodiment, the six ladar sensors comprised of 2 long range sensors 20 and 4 short range sensors 22 provide a full 360° field of view, and a 3D map may be synthesized by scene processor 52 for the entire space surrounding and in front of vehicle 2. Some vehicle installations also include rear facing long range ladar sensors 20 (not shown) to provide an additional margin of safety. Overlapping fields of view between long range sensors may allow scene processor 52 to eliminate some shadows in the far field pattern, or to gain additional shape data which may allow positive identification of an object or obstacle in the path of the vehicle 2. Overlapping fields of view between short range and long range sensors give scene processor 52 additional shape information on any feature or object in the combined field of view, as well as a reduction of shadows, owing to the wider angles swept out by the short range sensors 22. Control processor 44 receives status data from the ladar sensors indicating laser temperature, transmitted laser pulse power and pulse shape, receiver temperature, background light levels, etc, and makes decisions about adjustments of global input parameters to the various ladar sensors being controlled. Global settings for detector bias, trigger sensitivity, trigger mode or SULAR (Staring Underwater Laser Radar) mode, filter bandwidth, etc. may be sent from control processor 44 to a given ladar sensor which may override the local settings originally set or adjusted by a local control processor residing within a particular ladar sensor. SULAR mode and trigger mode operations are described in detail with respect to FIG. 5. A non-volatile memory 46 provides a storage location for the programs which run on control processor 44 and scene processor 52, and may be used to store status data and other data useful at start-up of the system. A data communications port 42 typically comprises an Ethernet port or Gigabit Ethernet port, but may be a USB, IEEE1394, Infiniband, or other general purpose data port, and is connected so as to provide bidirectional communications between the control processor 44 or the scene processor 52 and the vehicle electrical systems and central processors 28 through connections 54. Connections 54 may be optical, electrical, or a combination of both, and include any transmitters and receivers necessary to condition and transmit the data signals in both directions. Data communications port 42 may also be a special purpose communications port specific to a vehicle manufacturer. The 3D range data derived from the reflections of the modulated laser light allows for an initial object model to be determined, and for some object identification to take place in a processor of the individual ladar sensors installed on vehicle 2. Refinements of the object model may be made at higher levels in the system where data from the several sensors may be integrated with the data from previous frames. This capability of looking at historical data as well as current data, allows for some road hazards and collision threats to be viewed from a plurality of angles as the vehicle 2 travels forward, thus eliminating some shadows, while additional shape information is developed from the multiple angles of observation. Having this additional object data may allow scene processor 52 to refine the object models stored in memory 46. A more precise object model may allow scene processor 52 or vehicle CPU 28 to make better progress in identifying the various objects and features which may pose a collision threat to vehicle 2.

Figure 5:
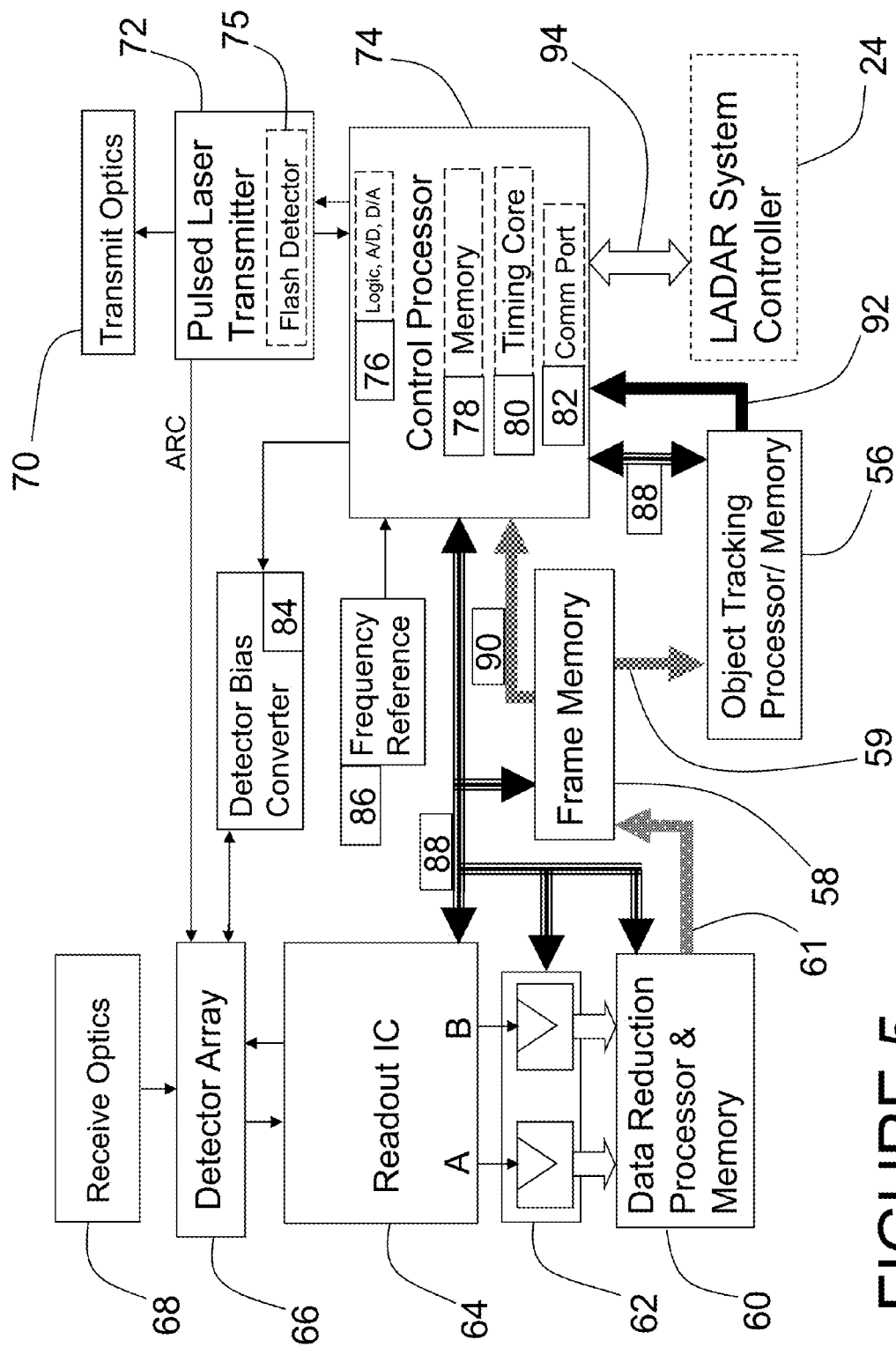
FIG. 5 is a block diagram of a typical ladar sensor.

FIG. 5 is a block diagram of a ladar sensor which describes both long range ladar sensors 20 and short range sensors 22 typical of the preferred embodiment. Adaptations of the pulsed laser transmitter 72, transmit optics 70, receive optics 68, and in some cases, programmable changes to the sampling circuitry of readout integrated circuit 64 may be effected to provide range enhancement, wider or narrower field of view, and reduced size and cost. The first embodiment provides a 128×128 or 128×64 detector array 66 of light detecting elements situated on a single insulating sapphire substrate which is stacked atop a readout integrated circuit 64 using a hybrid assembly method. In other embodiments of the design, M×N focal plane arrays of tight detecting elements with M and N having, values from 2 to 1024 and greater are anticipated. The functional elements depicted in FIG. 5 may first be described with respect to the elements of a typical short range ladar sensor 22. A control processor 74 controls the functions of the major components of the ladar sensor 22. Control processor 74 connects to pulsed laser transmitter 72 through bidirectional electrical connections (with logic, analog to digital (A/D) and digital to analog (D/A) converters 76) which transfer commands from control processor 24 to pulsed laser transmitter 72 and return monitoring signals from pulsed laser transmitter 72 to the control processor 74. The logic, including analog to digital (A/D) and digital to analog (D/A) converters 76, may reside completely or in part on the readout integrated circuit. A light sensitive diode detector (Flash Detector) 75 is placed at the back facet of the laser so as to intercept a portion of the laser light pulse produced by the pulsed laser transmitter 72. An optical sample of the outbound laser pulse taken from the front facet of pulsed laser transmitter 72 is routed to a corner of the detector array 66 as an automatic range correction (ARC) signal, typically over a fiber optic cable. The pulsed laser transmitter 72 may be a solid-state laser, monoblock laser, semiconductor laser, fiber laser, or an array of semiconductor lasers. It may also employ more than one individual laser to increase the data rate. In a preferred embodiment, pulsed laser transmitter 72 is an array of vertical cavity surface emitting lasers (VCSELs). In an alternative embodiment, pulsed laser transmitter 72 is a disc shaped solid state laser of erbium doped phosphate glass pumped by 976 nanometer semiconductor laser light.

In operation, the control processor 74 initiates a laser illuminating pulse by sending a logic command or modulation signal to pulsed laser transmitter 72, which responds by transmitting an intense pulse of laser light through transmit optics 70. In the case of a solid state laser based on erbium glass, neodymium-YAG, or other solid-state gain medium, a simple bi-level logic command may start the pump laser diodes emitting into the gain medium for a period of time which wilt eventually result in a single flash of the pulsed laser transmitter 72. In the case of a semiconductor laser which is electrically pumped, and may be modulated instantaneously by modulation of the current signal injected into the laser diode, a modulation signal of a more general nature is possible, and may be used with major beneficial effect. The modulation signal may be a flat-topped square or trapezoidal pulse, or a Gaussian pulse, or a sequence of pulses. The modulation signal may also be a sinewave, gated or pulsed sinewave, chirped sinewave, or a frequency modulated sinewave, or an amplitude modulated sinewave, or a pulse width modulated series of pulses. The modulation signal is typically stored in on-chip memory 78 as a lookup table of digital memory words representative of analog values, which lookup table is read out in sequence by control processor 74 and converted to analog values by an onboard digital-to-analog (D/A) converter 76, and passed to the pulsed laser transmitter 72 driver circuit. The combination of a lookup table stored in memory 78 and a DA converter, along with the necessary logic circuits, clocks, and timers 80 resident on control processor 74, together comprise an arbitrary waveform generator (AWG) circuit block. The AWG circuit block may alternatively be embedded within a laser driver as a part of pulsed laser transmitter 72. Transmit optics 70 diffuse the high intensity spot produced by pulsed laser transmitter 72 substantially uniformly over the desired field of view to be imaged by the short range ladar sensor 22. An optical sample of the transmitted laser pulse (termed an ARC signal) is also sent to the detector array 66 via optical fiber. A few pixels in a corner of detector array 66 are illuminated with the ARC (Automatic Range Correction) signal, which establishes a zero time reference for the timing circuits in the readout integrated circuit (ROIC) 64. Each unit cell of the readout integrated circuit 64 has an associated timing circuit which is started counting by an electrical pulse derived from the ARC signal. Alternatively, the flash detector 75 signal may be used as a zero reference in a second timing mode. Though the ARC signal neatly removes some of the variable delays associated with transit time through the detector array 66, additional cost and complexity is the result. Given digital representations of the image frames, the same task may be handled in software/firmware by a capable embedded processor such as data reduction processor 60. When some portion of the transmitted laser pulse is reflected from a feature in the scene in the field of view of the short range ladar sensor 22, it may be incident upon receive optics 68, typically comprising the tens of an auxiliary lamp assembly and an array of microlenses atop detector array 66. Alternative embodiments use enhanced detectors which may not require the use of microlenses. Other alternative embodiments of receive optics 68 employ diffractive arrays to collect and channel the incoming light to the detector array 66 individual elements. Pulsed laser light reflected from a feature in the scene in the field of view of receive optics 68 is collected and focused onto an individual detector element of the detector array 66. This reflected laser tight optical signal is then detected by the affected detector element and converted into an electrical current pulse which is then amplified by an associated unit cell electrical circuit of the readout integrated circuit 64, and the time of flight measured. Thus, the range to each reflective feature in the scene in the field of view is measurable by the short range ladar sensor 22. The detector array 66 and readout integrated circuit 64 may be an M×N or N×N sized array. Transmit optics 70 consisting of a spherical lens, cylindrical lens, holographic diffuser, diffractive grating array, or microlens array, condition the output beam of the pulsed laser transmitter 72 into a proper conical, elliptical, or rectangular shaped beam for illuminating a central section of a scene or objects in the path of vehicle 2, as illustrated in FIG. 1.

Figure 18:
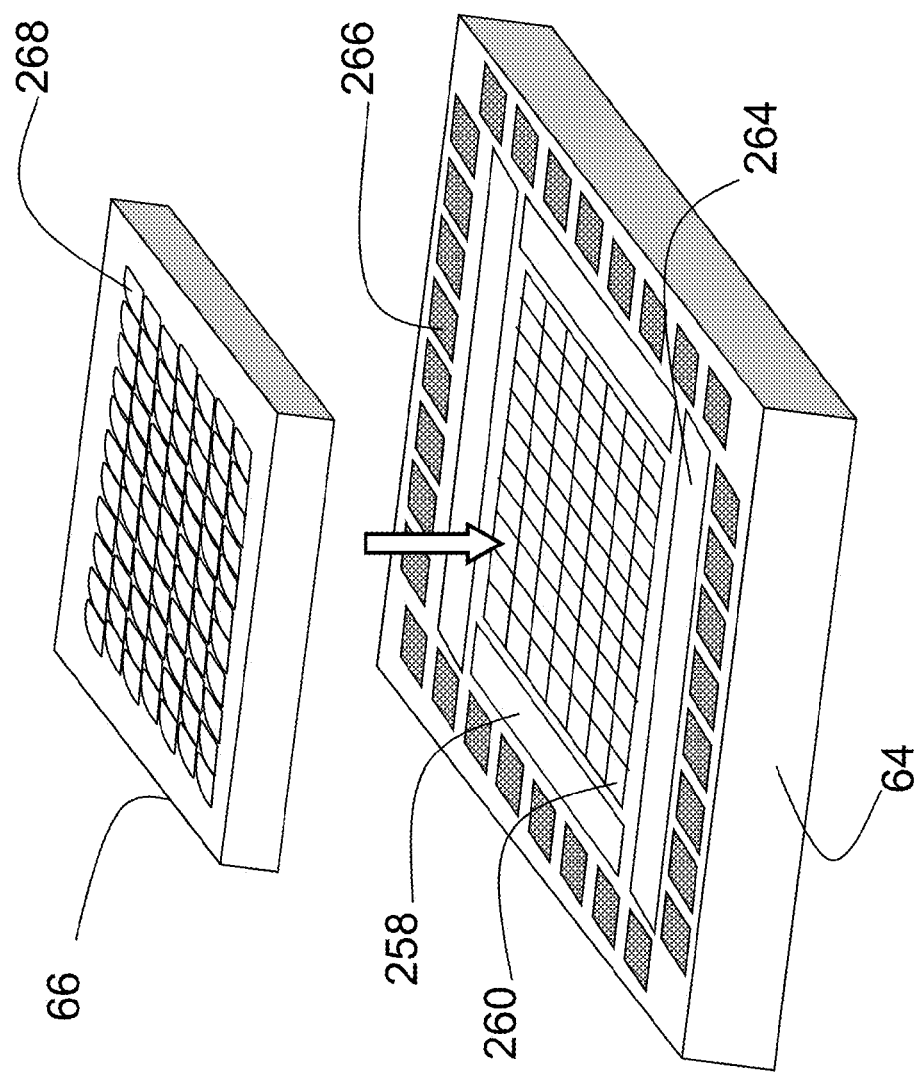
FIG. 18 is an isometric view of the hybrid assembly of the detector array and readout integrated circuit described herein; and, FIG. 19 is an isometric view of the detail of the indium bump situated atop each of the readout integrated circuit unit cells.

Continuing with FIG. 5, receive optics 68 may be a convex lens, spherical lens, cylindrical lens or diffractive grating array. Receive optics 68 collect the light reflected from the scene and focus the collected light on the detector array 66. In a preferred embodiment, detector array 66 is formed in a thin film of gallium arsenide deposited epitaxially atop an indium phosphide semiconducting substrate. Typically, detector array 66 would have a sa of cathode contacts exposed to the light and a set of anode contacts electrically connected to the supporting readout integrated circuit 64 through a number of indium bumps deposited on the detector array 66. The cathode contacts of the individual detectors of detector array 66 would then be connected to a high voltage detector bias grid on the illuminated side of the array. Each anode contact of the detector elements of detector array 66 is thus independently connected to an input of a unit cell electronic circuit of readout integrated circuit 64. This traditional hybrid assembly of detector array 66 and readout integrated circuit 64 may still be used, but new technology may reduce inter-element coupling, or crosstalk, and reduce leakage (dark) current and improve efficiency of the individual detector elements of detector array 66. In a preferred embodiment, the elements of detector array 66 may be formed atop a substantially monocrystalline sapphire wafer. Silicon-on-sapphire (SOS) substrates with a thin layer of substantially monocrystalline silicon grown epitaxially over a are available in the marketplace, and are well known for their superior performance characteristics. A detector array 66 of APD, PIN, or PN junction detectors may be formed of a sequence of layers of p-type and n-type silicon via epitaxial regrowth on the SOS wafers. Boron and aluminum may be used as dopants for any of the p-type silicon epitaxial layers. Phosphorus, arsenic, and antimony may be used as dopants for any of the n-type epitaxial layers. Sapphire substrates with a thin layer of epitaxially grown monocrystalline gallium nitride are also available in the marketplace (gallium nitride on sapphire, or GNOS), and are widely known as substrates well suited to the fabrication of high brightness blue LEDs. A detector array 66 of APD, PIN, or RN junction detectors may be formed of a sequence of layers of p-type and n-type gallium nitride (GaN) or indium gallium nitride (InGaN) via epitaxial regrowth on the GNOS wafers. Silicon and germanium may be used as dopants for any of the n-type GaN layers. In some cases, magnesium may be used as a dopant for of the p-type layers in GaN. In a further development, detector array 66 may be fabricated monolithically directly atop readout IC 64. Detector array 66 may also be formed in a more conventional manner from compounds of indium gallium arsenide, indium aluminum arsenide, silicon carbide, diamond, mercury cadmium telluride, zinc selenide, or other well known semiconductor detector system. Readout integrated circuit 64 comprises a rectangular array of unit cell electrical circuits, each unit cell with the capability of amplifying a low level photocurrent received from an optoelectronic detector element of detector array 66, sampling the amplifier output, and detecting the presence of an electrical pulse in the unit cell amplifier output associated with a light pulse reflected from the scene and intercepted by the detector element of detector array 66 connected to the unit cell electrical input. The detector array 66 may be an array of avalanche photodiodes, capable of photoelectron amplification, and modulated by an incident light signal at the design wavelength. The detector array 66 elements may also be a P-intrinsic-N design or N-intrinsic-P design with the dominant carrier being holes or electrons respectively; in which case the corresponding ROIC 64 would have the polarity of the bias voltages and amplifier inputs adjusted accordingly. The hybrid assembly of detector array 66 and readout integrated circuit 64 of the preferred embodiment is shown in FIG. 18; and the assembly is then mounted to a supporting circuit assembly, typically on a FR-4 substrate or ceramic substrate 222 (reference FIGS. 15-17). The circuit assembly provides support circuitry which supplies conditioned power, a reference clock signal, calibration constants, and selection inputs for the readout column and row, among other support functions, while receiving and registering range and intensity outputs from the readout integrated circuit 64 for the individual elements of the detector array 66, and shown in FIGS. 14-17 and described subsequently as a circuit substrate 222 and attached electrical components. Many of these support functions may be implemented in Reduced Instruction Set Computer (RISC) processors which reside on the same circuit substrate 222. A detector bias converter circuit 84 applies a time varying detector bias to the detector array 66 which provides optimum detector bias levels to reduce the hazards of saturation in the near field of view of detector array 66, white maximizing the potential for detection of distant objects in the field of view of detector array 66. The contour of the time varying detector bias supplied by detector bias converter 84 is formulated by control processor 74 based on feedback from the data reduction processor 60, indicating the reflectivity and distance of objects or points in the scene in the field of view of the detector array 66. Control processor 74 also provides several clock and timing signals from a timing core 80 to readout integrated circuit 64, data reduction processor 60, analog-to-digital converters 62, object tracking processor 56, and their associated memories. Control processor 74 relies on a temperature stabilized or temperature compensated frequency reference 86 to generate a variety of clocks and timing signals. Temperature stabilized frequency reference 86 may be a temperature compensated crystal oscillator (TCXO), dielectric resonator oscillator (DRO), or surface acoustic wave device (SAW). Timing core 80 resident on control processor 74 may include a high frequency tunable oscillator, programmable prescaler dividers, phase comparators, and error amplifiers.

Continuing with FIG. 5, control processor 74, data reduction processor 60, and object tracking processor 56 each have an associated memory for storing programs, data, constants, and the results of operations and calculations. These memories, each associated with a companion digital processor, may include ROM, EPROM, or other non-volatile memory such as flash. They may also include a volatile memory such as SRAM or DRAM, and both volatile and non volatile memory may be integrated into each of the respective processors. A common frame memory 58 serves to hold a number of frames, each frame being the image resulting from a single laser pulse. Both data reduction processor 60 and object tracking processor 56 may perform 3D image processing, to reduce the load on a central processing unit normally associated with ladar system controller 24. There are two modes of data collection, the first being SULAR, or a progressive scan in depth. Each laser pulse typically results in 20 "slices" of data, similar to a CAT scan, and each "slice" may be stored as a single page in the common frame memory 58. With each pixel sampling at a 2 nanosecond interval, the "slices" are each a layer of the image space at roughly 1 foot differences in depth. The 20 slices represent a frame of data, and the sampling for a succeeding laser pulse may be started at 20 feet further in depth, so that the entire image space up to 1000 feet in range or depth, may be swept out in a succession of 50 laser illuminating pulses, each laser pulse response consisting of 20 "slices" of data held in a single frame entry. In some cases, the frame memory may be large enough to hold all 50 frames of data. The number of slices stored could be enough to map out any relevant distance, with no trigger mode operation required. The reduction of the data might then take place in an external computer, as in the case of data taken to map an underwater surface, or a forest with tree cover, or any static landscape, where sophisticated post-processing techniques in software may yield superior accuracy or resolution. A second data acquisition mode is the TRIGGER mode, where the individual pixels each look for a pulse response, and upon a certain pulse threshold criteria being met, the 20 analog samples bracketing the pulse time of arrival are retained in the pixel analog memories, and a running digital counter is frozen with a nominal range measurement. The 20 analog samples are output from each pixel through the "A" and "B" outputs of readout integrated circuit 64, which represent the interleaved row or column values of the 128×128 pixel of the present design. The "A" and "B" outputs are analog outputs, and the analog samples presented there are converted to digital values by the dual channel analog-to-digital (A/D) converter 62. Interleaving the outputs means one of the outputs ("A") reads out the odd numbered tines of the readout IC 64, and the other output ("B") reads out the even numbered lines of the readout IC 64. Larger detector arrays 66 may have more than two digital outputs. The digital outputs of the A/D converters 62 connect to the inputs of the data reduction processor 60. A/D converters 62 may also be integrated into readout integrated circuit 64. The digital outputs are typically 10 or 12 bit digital representations of the uncorrected analog samples measured at each pixel of the readout IC 64, but other representations with greater or fewer bits may be used, depending on the application. The rate of the digital outputs depends upon the frame rate and number of pixels in the array. In TRIGGER mode, a great deal of data reduction has already transpired, since the entire range or depth space may be swept out in the timeframe of a single laser pulse, and the data reduction processor 60 would only operate on the 20 analog samples stored in each unit cell in order to refine the nominal range measurement received from each pixel (unit cell) of the array. The data reduction processor 60 refines the nominal range measurements received from each pixel by curve fitting of the analog samples to the shape of the outgoing laser illuminating pulse, which is preserved by the reference ARC pulse signal. The range measurements may also be refined by curve fitting to a well known reference pulse characteristic shape. In TRIGGER acquisition mode, the frame memory 58 only needs to hold a "point cloud" image for each illuminating laser pulse. The term "point cloud" refers to an image created by the range and intensity of the reflected light pulse as detected by each pixel of the 128×128 array of the present design. In TRIGGER mode, the data reduction processor serves mostly to refine the range and intensity (R&I) measurements made by each pixel prior to passing the R.&I data to the frame memory 58 over data bus 61, and no "slice" data or analog samples are retained in memory independently of the R&I "point cloud" data in this acquisition mode. Frame memory 58 provides individual or multiple frames, or full point cloud images, to control processor 74 over data bus 90, and to an optional object tracking processor 56 over data bus 59 as required.

As shown in FIG. 5, data reduction processor 60 and control processor 74 may be of the same type, a reduced instruction set (RISC) digital processor with hardware encoded integer and floating point arithmetic units. Object tracking processor 56 may also be of the same type as RISC processors 60 and 74, but may in some cases be a processor with greater capability, suitable for highly complex graphical processing. Object tracking processor 56 may have in addition to hardware encoded integer and floating point arithmetic units, a number of hardware encoded matrix arithmetic functions, including but not limited to; matrix determinant, matrix multiplication, and matrix inversion. In operation, the control processor 74 controls readout integrated circuit 64, A/D converters 62, frame memory 58, data reduction processor 60 and object tracking processor 56 through a bidirectional control bus 88 which allows for the master, control processor 74 to pass commands on a priority basis to the dependent peripheral functions; readout IC 64, A/D converters 62, frame memory 58, data reduction processor 60, and object tracking processor 56. Bidirectional control bus 88 also serves to return status and process parameter data to control processor 74 from readout IC 64, A/D converters 62, frame memory 58, data reduction processor 60, and object tracking processor 56. Data reduction processor 60 refines the nominal range data and adjusts each pixel intensity data developed from the digitized analog samples received from A/D converters 62, and outputs a full image frame via unidirectional data bus 61 to frame memory 58, which is a dual port memory having the capacity of holding several frames to several thousands of frames, depending on the application. Object tracking processor 56 has internal memory with sufficient capacity to hold multiple frames of image data, allowing for multi-frame synthesis processes, including video compression, single frame or multi-frame resolution enhancement, statistical processing, and object identification and tracking. The outputs of object tracking processor 56 are transmitted through unidirectional data bus 92 to a communications port 82, which may be resident on control processor 74. All slice data, range and intensity data, control, and communications then pass between communications port 82 and a centralized ladar system controller 24, (FIG. 4) through bidirectional connections 94. Power and ground connections (not shown) may be supplied through an electromechanical interface. Bidirectional connections 94 may be electrical or optical transmission lines, and the electromechanical interface may be a DB-25 electrical connector, or a hybrid optical and electrical connector, or a special automotive connector configured to carry signals bidirectionally for the short range ladar sensor 22 as well as electrical connections for an auxiliary lamp assembly which may have the short range ladar sensor 22 embedded therein. Bidirectional connections 94 may be high speed serial connections such as Ethernet, Universal Serial Bus (USB), or Fibre Channel, or may also be parallel high speed connections such as Infiniband, etc., or may be a combination of high speed serial and parallel connections, without limitation to those listed here. Bidirectional connections 94 also serve to upload information to control processor 74, including program updates for data reduction processor 60, object tracking processor 56, and global position reference data, as well as application specific control parameters for the remainder of the short range ladar sensor 22 functional blocks. Inertial and vertical reference 32 (see FIG. 3) also provides data to the short range ladar sensors 22 and long range ladar sensors 20 from the host vehicle 2 through the vehicle electrical systems and CPU 28 and the ladar system controller 24 as needed. Likewise, any other data from the host vehicle 2 which may be useful to the short range ladar sensor 22 may be provided in the same manner as the inertial and vertical reference data. Inertial and vertical reference data may be utilized in addition to external position references by control processor 74, which may pass position and inertial reference data to data reduction processor 60 for adjustment of range and intensity data, and to object tracking processor 56 for utilization in multi-frame data synthesis processes. The vertical reference commonly provides for measurement of pitch and roll, and is adapted to readout an elevation angle, and a twist angle (analogous to roll) with respect to a horizontal plane surface normal to the force of gravity. The short range ladar sensor 2 typically employs a semiconductor laser, which may be modulated in several different ways. The long range ladar sensor 20 typically employs a q-switched solid state laser, which produces a single output pulse with a Gaussian profile if properly controlled. The pulse shape of a solid state laser of this type is not easily modulated, and therefore must be dealt with "as is" by the receiver section of a long range ladar sensor 20. The operations of a short range ladar sensor 22 of the type which are typically embedded in an auxiliary lamp assembly such as a taillight, turn signal, or parking light are the same as the operations of the long range ladar sensor 20 with some exceptions. The long range ladar sensor 20 and short range ladar sensor 22 may differ only in the type of laser employed and the type of laser modulation. The transmit optics 70 and receive optics 68 may also differ, owing to the different fields of view for a long range ladar sensor 20 and a short range ladar sensor 22. Differences in the transmitted laser pulse modulation between the long range ladar sensor 20 and short range ladar sensor 22 may be accommodated by the flexible nature of the readout IC 64 sampling modes, and the data reduction processor 60 programmability. The host vehicle 2 may have a number of connector receptacles generally available for receiving mating connector plugs from USB, Ethernet, RJ-45, or other interface connection, and which may alternatively be used to attach long range ladar sensors 20 or short range ladar sensors 22 of the type described herein.

In the preferred embodiments described herein, a number of digital processors have been identified, some associated with the host vehicle (total 2), some associated with the ladar subsystem (total 3), and some associated with the individual ladar sensors (total 3). The partitioning and the naming of these various digital processors has been made based on engineering judgment, but other partitioning and naming conventions may be used without changing the scope or intent, or affecting the utility of the invention. The function of those processors associated with the vehicle; the vehicle CPU 28, and the collision processor and airbag control unit 38, may be combined in a single digital processor some future embodiments. A combined vehicle CPU 28 and collision processor and airbag control unit 38 may also incorporate ladar system controller 24, which is normally associated with the ladar subsystem. The ladar system controller 24 (including scene processor 52 and control processor 44) may in some alternative embodiments be eliminated as a circuit, and only the functions normally performed by ladar system controller 24, as described herein as contemplated for use with the present invention, would then be assumed by a more powerful vehicle CPU 28. Likewise, the object tracking processor 56 of the individual ladar sensor could be absorbed into the vehicle CPU 28, as could other ladar sensor processors such as data reduction processor 60 and control processor 74. This would follow a trend toward greater centralization of the computing power in the vehicle. A trend towards decentralization may also take place in reverse, some alternative embodiments having ever more of the processing power pushed down into the ladar sensor subsystem. In other alternative embodiments, perhaps in a robotic vehicle where only a single ladar sensor might be installed, substantially all of the processing power could be incorporated in the individual ladar sensor itself. The term digital processor may be used generically to describe either controllers or digital computers, as many controllers may also perform pure mathematical computations, or perform data reduction, and since many digital computers may also perform control operations. Whether a digital processor is termed a controller or a computer is a descriptive distinction, and not meant to limit the application or function of either device.

Continuing with FIG. 5, the use of a semiconducting laser in a preferred embodiment for a short range ladar sensor 22 allows for tailoring of the drive current to a Vertical-Cavity Surface-Emitting Laser (VCSEL), one example of a semiconductor laser, or any diode laser, so as to produce a Gaussian optical pulse shape with only slight deviations. The VCSEL response time is in the sub-nanosecond regime, and the typical pulse width might be 5-100 nanoseconds at the half power points. In the diagram of FIG. 5, the VCSEL and laser driver would be part of the pulsed laser transmitter 72, and the desired pulse or waveshape is itself produced by a digital-to-analog converter 76 which has a typical conversion rate of 200-300 MHz, so any deviations in the output pulse shape from the Gaussian ideal may be compensated for in the lookup table in memory 78 associated with control processor 74, which serves as the digital reference for the drive current waveform supplied to the laser driver within pulsed laser transmitter 72 by the D/A, converter. A Gaussian single pulse modulation scheme works well at short ranges, given the limited optical power available from a VCSEL. Extending the range of a VCSEL transmitter may be done using more sophisticated modulation schemes such as multi-pulse sequences, sinewave bursts, etc. The VCSEL, and modulation schemes as described herein with reference to short range ladar sensor 22 are an alternative to the solid state laser typically used in a pulsed laser transmitter 72 of a long range ladar sensor 20. The use of a VCSEL array in pulsed laser transmitter 72 has the potential to reduce cost, size, power consumption, and/or enhance reliability. Ladar sensors may be mounted at many points on the vehicle 2; door panels, rear view mirrors, bumpers, etc. When equipped with a more sensitive detector array 66 such as an image tube FPA, an auxiliary ladar sensor of the type described herein may use a VCSEL array as an illuminating source, and longer ranges may be supported.

Figure 6:
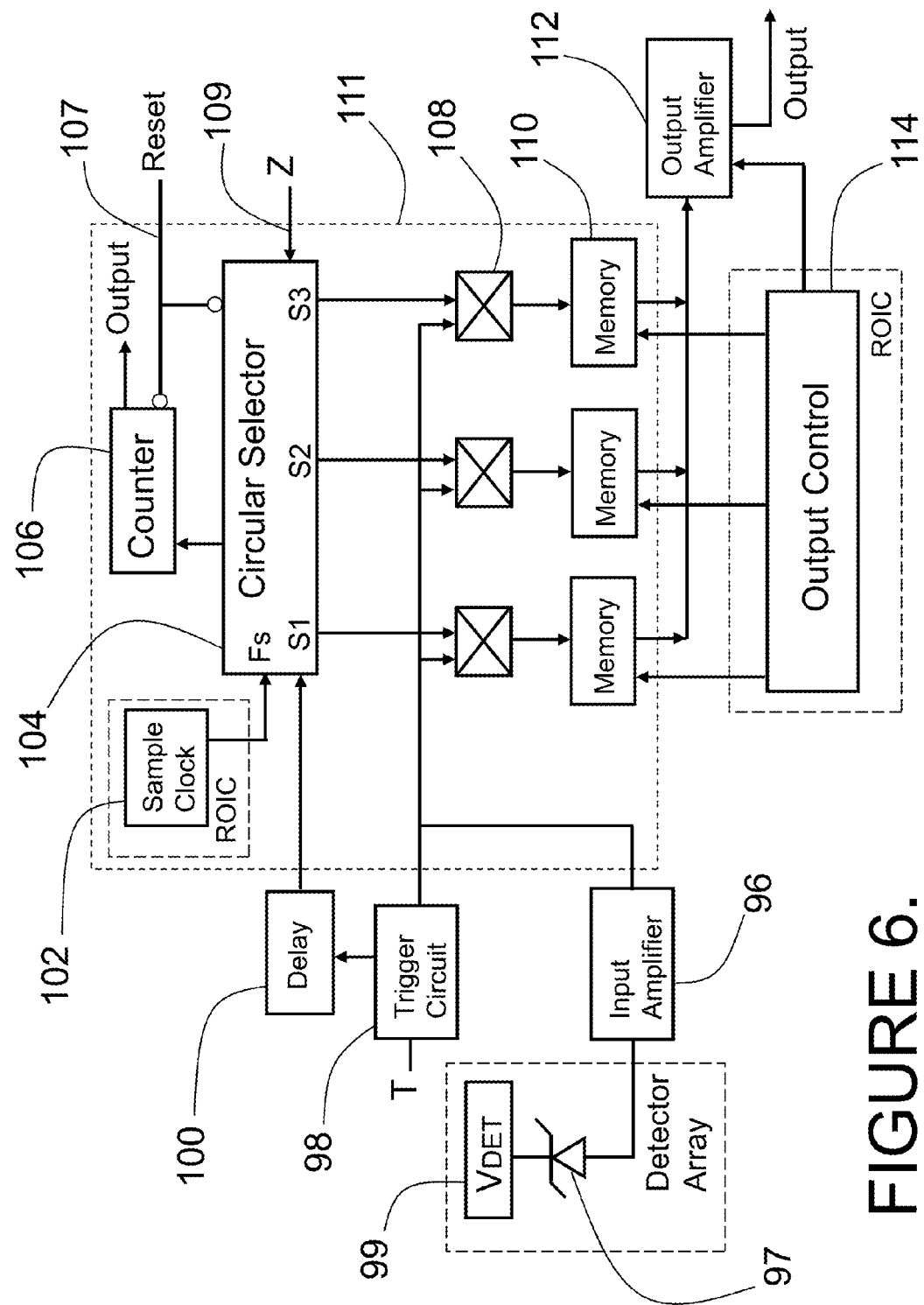
FIG. 6 shows the details of the electronic circuits common to each unit cell of the readout integrated circuit.

The unit cell electronics depicted in FIG. 6 is well adapted to work with a Gaussian single pulse modulation scheme, and works advantageously with other modulation schemes as well, including sequences of flat-topped pulses, Gaussian, or otherwise shaped pulses. These pulses may be of varying width and spacing, in order to reduce range ambiguities, and may also be random pulse sequences, or in other cases, Barker coded pulse sequences. In the typical operation of a short range ladar sensor 22 having a semiconductor laser producing a single Gaussian output pulse, some portion of the pulsed laser light reflected from a surface in the field of view of the short range ladar sensor 22 is concentrated and focused by receive optics 68 and falls on an individual detector element 97 of detector array 66. The individual element 97 is typically an avalanche photodiode, but may be a PIN or NIP, or other structure. Each individual element 97 of detector array 66 is formed in a semiconducting film comprised of silicon, indium gallium arsenide phosphide, aluminum gallium arsenide, indium gallium nitride, or other semiconducting compound appropriate to the wavelength of operation. Each individual element 97 is biased with a voltage by a bias voltage distribution network $V_{DET}$ 99. The reflected light signal incident upon the individual detector element 97 is converted to an electronic signal, typically a photocurrent, and amplified by input amplifier 96, typically transimpedance amplifier. The output of input amplifier 96 is distributed to a trigger circuit 98 as welt as a number of analog sampling gates 108. The trigger circuit 98 is typically a threshold voltage comparator, set to trigger when a pulse is received which exceeds a predetermined magnitude, though other pulse detection schemes may be used. After a programmable delay through delay circuit 100, the state of circular selector 104 is frozen by the logic transition of trigger circuit 98 output. Prior to the detection of a received pulse by trigger circuit 98, the sample clock 102 causes the state of circular selector 104 to advance, enabling one of the sampling control outputs S1-S3, which in turn causes a sampling of the input amplifier 96 output by one of the sampling gates 108. The number of transitions of sample clock 102 are counted by counter 106, as the circular selector 104 outputs a logic transition to counter 106 for every cycle of the sampling clock after the release of the active low reset line 107. Circular selector 106 may cycle through outputs S1-S3 in order, or may have a different order, depending on the programming. A second circular selector 106, and sample clock 102 may operate in parallel, along with counter 106, analog sampling gates 108 and analog memory cells 110. The combination of sample clock 102, counter 106, circular selector 104, sampling gates 108, and memory cells 110 may be termed a unit cell sampling structure 111, indicated by the short dashed line border. Two, three, or more of these sampling structures may be operated in parallel on the output of input amplifier 96, with the advantages of such a structure to be described later in regards to range ambiguity. Shown in FIG. 6 are three sampling gates, and analog memory cells, but the number may be several hundred or more on some readout ICs 64. Once all of the analog sample data has been taken, a control command from the control processor 74 initiates a readout cycle by activating output control 114 and output amplifier 112 to readout the contents of the analog memory cells 110 in a predetermined order.

Ia typical short range ladar sensor 22, and assuming a 1 cm$^2$ VCSEL array with a 5 kW/cm$^2$ power density, and depending upon the reflectivity of the objects in the field of view, and the responsivity and excess noise of the detector array 66, the effective range of a Gaussian single pulse modulation scheme might be in the range of 10-20 meters, using a simple threshold detection technique. Without resorting to a large VCSEL array, which might be expensive and might require a large discharge capacitor to supply a large current pulse, more sophisticated modulation and detection techniques can be used to create additional processing gains, to effectively increase the signal-to-noise ratio, and thus extend the range of the short range ladar sensor 22 without requiring an increase in peak power. In a first modulation scheme, which produces a Gaussian single pulse modulation, a detection technique may be employed which uses the digitized analog samples from each unit cell electrical circuit, and processes these samples in a digital matched filter to find the centroid of the received pulse, resulting in significant processing gain. The processing gains resulting from this structure are proportional to the square root of the number of samples used in the filtering algorithm. For example, a unit cell electrical circuit with 256 analog memory cells 110 could yield a processing gain of 16 if all the available analog samples were used in a matched filter algorithm, assuming Gaussian single pulse modulation, and a normal noise distribution. The term "processing gain" is used here to describe the increase in effective signal-to-noise ratio (SNR) realized by performing the described operations on the voltage samples. Assuming the pulsed laser light is distributed uniformly over just the field of view of the receive optics 68, the effective range of the ladar also increases as the square root of the transmitted power (or SNR), and an increase in range to 40-80 meters could be the result. Single pulse Gaussian modulation may be characteristic of either a solid state laser or a semiconductor laser with a simple driver, and thus may be an attribute of either a tong range ladar sensor 20 or a short range ladar sensor 22.

The unit cell electronic circuit of FIG. 5 is well adapted to single pulse modulation, or to more complex modulation scenarios. In a second modulation scheme, a VCSEL array modulated with a series of Barker encoded flat-topped or Gaussian pulses can be sampled by the unit cell electronics of FIG. 5 and analyzed by data reduction processor 60 for range and intensity estimates. In a third modulation scheme, a VCSEL array modulated with a pulsed sinewave allows for greater cumulative energy to be reflected from a feature in a scene in the field of view of either a short range ladar sensor 22 or a long range ladar sensor 20 without an increase in peak power. Each peak of a pulsed sinewave will have a separate reflection from an object or feature in the scene in the field of view of the ladar sensor (20, 22) and the unit cell electrical circuit of FIG. 5 allows the ladar sensor receiver to respond to the cumulative energy from many of these reflected pulses using a minimum of circuitry. The waveform in a preferred embodiment is a number of sinewave cycles, and the number could be quite large, depending on a number of factors. The receiver circuitry of the unit cell electronics shown in FIG. 5 is capable of sampling or of synchronously detecting the cumulative energy of the returned pulse peaks. Two sampling modes may be supported by the unit cell sampling structure shown in FIG. 5. When taking analog samples of single pulse or multi pulse sequences, wherein analog samples of an incoming waveform are being sequentially taken, the sampling impedance control 109 (Z) to the circular selector 104 would be set to a minimum value. The sampling frequency of sample clock 102 would also be selected to produce 10 or perhaps 20, analog samples during each pulse width. When the sampling impedance control 109 is set to a minimum, the sample controls S1, S2, S3 . . . turn on with full voltage during a sampling cycle. Since each sampling gate 108 is a field effect transistor, increasing the sample control voltage S1-S3 will increase the gate-source voltage on the sampling FET, thus lowering the impedance of the channel between source and drain, and setting the sampling gate impedance to a minimum. When the sampling gate 108 impedance is set to a minimum, the storage capacitor serving as analog memory cell 110 charges rapidly to the voltage present at the output of input amplifier 96. This mode can be termed "instantaneous voltage sampling" to distinguish the mode from a second sampling mode, which is selected when the sampling impedance control 109 is set to a higher, or even maximum value. When the sampling impedance control 109 is selected for high impedance, or maximum series resistance value, the outputs S1-S3 would be at or near minimum voltages when enabled, resulting in a lower gate-source voltage across each of the sampling gate FETs 108, and thus a higher sampling gate series resistance in the channel between source and drain of each sampling gate 108 FET. With the series resistance of the sampling gates 108 set to high or maximum value, the effect is to cause an R-C filter to develop, with the analog memory cell 110 storage capacitor performing as an integrating capacitor. This second sampling mode may be very useful when a sinusoidal modulation is applied to the pulsed laser transmitter 72 in the case where the laser is a semiconductor laser, typically a high efficiency VCSEL. By applying a sampling clock to the sampling gate 108 driven by S1, and which is the same frequency as the sinusoidal modulation, a sum frequency and a difference frequency will be in the sampled signal, and the analog memory cell 110 storage capacitor will filter out the sum frequency, and the difference frequency will be zero, leaving only a DC voltage component, which will be a trigonometric function of the phase difference. Over a number of cycles of the sinusoidal modulation from the output of input amplifier 96, this DC voltage will emerge as the sine or cosine of the phase difference between the transmitted and received waveforms. This phase difference is proportional to the range to a reflecting surface. To improve the processing gain, the second sampling gate driven by the S2 signal is driven by the same sampling clock frequency, but shifted by 90 degrees in phase, and the greater of the two DC voltages, or a ratio of the two voltages, may used to estimate phase, and thereby range. Typically, a ratio is preferred, as it removes the variation in amplitude of the incoming sinewave as an error term. This type of detection relies on "In-phase" and "Quadrature-phase" local references, and is often referred to as an "I&Q" detection scheme. Thus, the sampling gates 108 can be operated as instantaneous voltage samplers in a first sampling mode, or as frequency mixers in a second sampling mode, depending on the state of the sampling impedance control 109, and the frequency applied by sampling clock 102. In the first sampling mode, the shape of a pulse or sequence of pulses may be acquired, and in second sampling mode, a periodic waveform modulation such as a sinewave, may be demodulated through the frequency mixing effect and integration on a storage capacitor, resulting in a phase measurement and thereby range. In a third modulation case, two and perhaps three sinewaves of different frequencies are superimposed as a modulation signal on a semiconductor laser, and the received waveform output from input amplifier 96 is sampled by 2 or 3 unit cell sampling structures 111 arranged in parallel, and operating at the 2 or 3 different frequencies of the modulation signal. Each frequency is demodulated and the phase measured b the unit cell sampling structure tuned to the frequency of interest by feeding the appropriate sampling frequency from sample clock 102, typically copy of the modulation frequency.

When measuring the phase of reflected laser energy with respect to a transmitted laser sinewave modulation, certain limits must be observed. If the ladar should have a maximum range capability of 150 meters in free space, the total round trip delay from transmit to receive would be around 1 microsecond. For the phase measurement to be meaningful, the frequency of transmission must therefore be less than 1 MHz to avoid spatial (distance) aliasing of targets at the 150 meter limit. In other words, the further the target, the lower the frequency of modulation must be for a single modulation frequency phase measurement to be meaningful. In a conventional sweep radar, the dwell time on the target is limited, so return signals beyond the maximum design range often do not appear as aliased, or "ghost" signals at a shorter apparent range. In the ladar of the instant invention, the typical mode is a staring mode, and there is no sweep of the illuminating beam or receiving antenna across the target space. Therefore, in the ladar sensor (20,22) of the present design, responses from targets beyond the designed maximum range could produce an aliased response (one in which the phase shift is greater than $2\pi$). A method for resolving these aliased, or "ghost" images is to illuminate the target in a second or third transmission with a slightly different frequency; for example 0.95 MHz versus the 1.0 MHz in a first gated sinewave illuminating pulse. If the target image remains at the same apparent range, it is likely a real target at a range less than the design maximum range limit. If the apparent range of the target shifts at the second illuminating frequency, it is likely the image is an aliased, or "ghost" image from a target at a distance beyond the design maximum range of the ladar sensor (20, 22). The ladar sensor (20, 22) of the instant invention makes use of a frequency agile transmitter which can rapidly tune from a first transmission frequency to a second transmission frequency, and more if necessary. In a preferred embodiment, the unit cell sampling structure 111 is doubled or tripled, and operated in parallel, and two or three sinewave modulation signals are superimposed on the semiconductor laser transmitter. When using multiple frequency modulation, the individual frequencies should not be simple harmonics of each other; i.e., they should not be related by fractions of low value integers. The ladar sensor (20, 22) in a preferred embodiment makes use of a semiconductor VCSEL laser, enabling the use of shaped single pulses, shaped multiple pulses, shaped and encoded multiple pulses, gated sinewave, gated chirped sinewave, and multi-frequency gated sinewave modulation schemes. In alternative embodiments, a low power semiconductor laser may be electronically modulated, and the resulting modulated optical output amplified by an optical amplifier. By selecting a modulation regime appropriate to the particular scene or objects to be imaged, the flexible modulation capabilities of the present design result in a minimum sized pulsed laser illuminating source with maximum performance in range and resolution.

Figure 7:
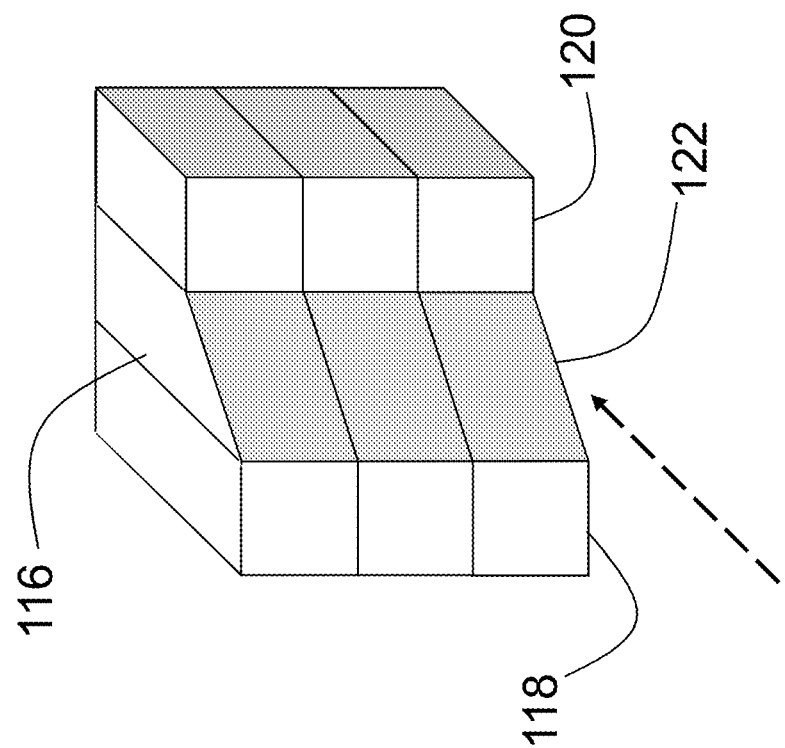
FIG. 7 is a diagram of a first section of an object of interest in the far field of the field of view of the ladar sensor, the object having a series of rectangular subsections roughly corresponding to the projection of a pixel of the detector array of the ladar sensor.

Shown in FIG. 7 is a target object which illustrates a key advantage of the pulse shape sampling capability of the unit cell electrical circuit of FIG. 6. The dashed line shows an incident plane wave which is perpendicular to surface 118 of object 116. The individual detectors 97 of detector array 66 are typically square. Object 116 is at a distance from the ladar sensor (here long range sensor 20) so the reflections from object 116 exactly subtend a 3×3 zone of pixels within the detector array 66. Surface 118 is a 1'×1' square stacked 3 high in a column, and at a distance from the ladar sensor 20 of 100'. Surface 120 is a 1'×1' square stacked 3 high in a column, but at a distance of 104' from the ladar sensor 20. Between surfaces 118 and 120 is angled plane surface 122 which slopes rearward 4' over a 1' foot width.

Figure 8:
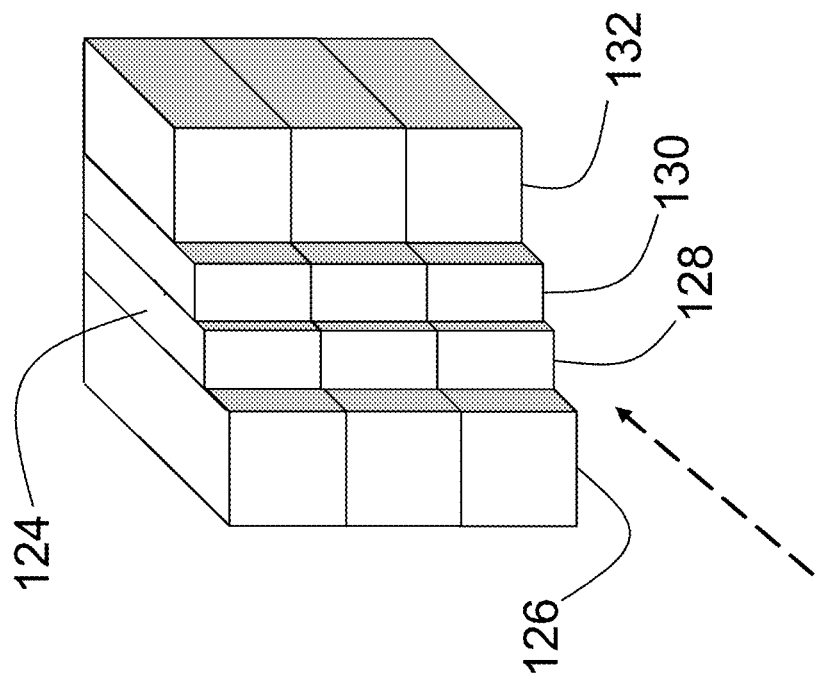
FIG. 8 is a diagram of a second section of an object of interest in the far field of the field of view of the ladar sensor, the object having a series of rectangular subsections roughly corresponding to the projection of a pixel of the detector array of the ladar sensor.

Shown in FIG. 8 is a target object which illustrates in a different manner the pulse shape sampling capability of the unit cell electrical circuit of FIG. 6. The dashed line shows an incident plane wave which is perpendicular to surface 126 of object 124. As noted above, the individual detectors 97 of detector array 66 are typically square. Object 124 is at a distance from the ladar sensor (long range sensor 20) so the reflections from object 124 exactly subtend a 3×3 zone of pixels within the detector array 66. Surface 126 is a 1'×1' square stacked 3 high in a column, and at a distance from the ladar sensor 20 of 100'. Surface 128 is a 0.5'×1' square stacked 3 high in a column, but at a distance of 101.5625' from the ladar sensor 20. Surface 130 is a 5'×1' square stacked 3 high in a column, but at a distance of 102.4375' from the ladar sensor 20. Surface 132 is a 1'×1' square stacked 3 high in a column, but at a distance of 104' from the ladar sensor 20.

Figure 9:
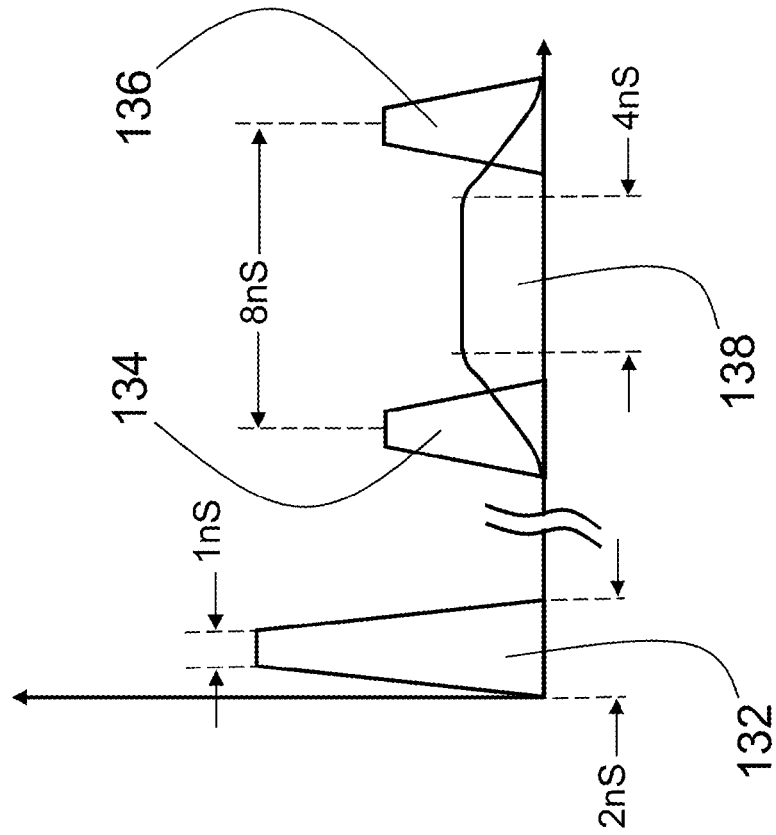
FIG. 9 is diagram showing the time line of a transmitted illuminating pulse and the reflected light pulse returned from the first section of the object of interest shown in FIG. 7, and the effect on the returned pulse shape of a slanted flat surface.

FIG. 9 shows the time response of object 116 to a 1ns trapezoidal pulse 132 having 0.5 ns rise and fall times. After an approximate 200 ns gap, reflected pulse 134 returns to detector pixels 1-3 in the leftmost column of the 3×3 illuminated zone of detector array 66 as described in the discussion of FIG. 7. Reflected pulse 134 has the same shape as the transmitted pulse 132, since surface 118 is perpendicular to the direction of propagation of the transmitted pulse 132. Reflected pulse 138 returns to detector pixels 4-6 in the center column of the 3×3 zone of detector array 66, with a leading edge coincident in time with the leading edge of reflected pulse 134. Since the pulse is 1.5 ns in total width, it takes 3 ns for reflected pulse 138 to build up to a full value. Also, it takes 3 ns for the reflected pulse 138 to return from the very last edge of surface 122 where it joins to surface 120. Therefore, a total width of 4 ns is at the maximum value, stretching the total width of the pulse 8 ns and the peak level by 3 ns. Reflected pulse 136 returns to detector pixels 7-9 in the rightmost column of the 3×3 zone of detector array 66, with a trailing edge coincident in time with the trailing edge of reflected pulse 138. The pulse shape sampling capability of the unit cell electrical circuit described on FIG. 6 allows the data reduction processor 60 to make an informed estimate of the shape of many sub-pixel features conforming to simple geometry as shown, by analyzing the shape of reflected pulses such as reflected pulse 138. Scene processor 52 may further refine the estimates of these sub-pixel features by both the pulse shape and surrounding geometry.

Figure 10:
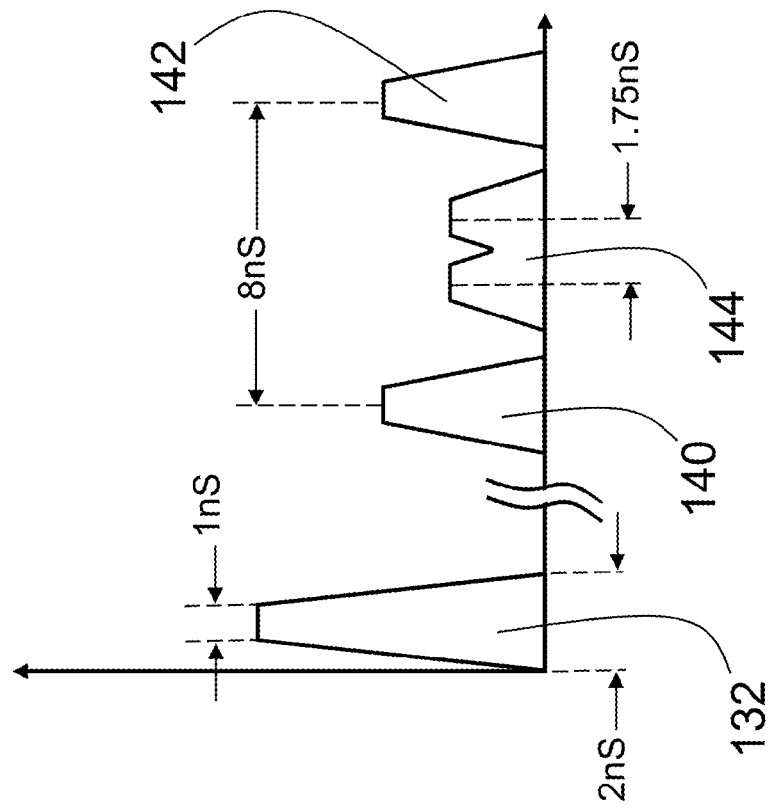
FIG. 10 is diagram showing the time line of a transmitted illuminating pulse and the reflected light pulse returned from the second section of the object of interest shown in FIG. 8, and the effect on the returned pulse shape of a stepped orthogonal surface.

FIG. 10 shows the time response of object 124 to a 1ns trapezoidal pulse 132 having 0.5 ns rise and fall times. After an approximate 200 ns gap, reflected pulse 140 returns to detector pixels 1-3 in the leftmost column of the 3×3 illuminated zone of detector array 66 as described in the discussion of FIG. 8. Reflected pulse 140 has the same shape as the transmitted pulse 132, since surface 126 is perpendicular to the direction of propagation of the transmitted pulse 132. Reflected pulse 144 returns to detector pixels 4-6 in the center column of the 3×3 zone of detector array 66, with a shape clearly showing two distinct and overlapping trapezoids. The first trapezoidal shape is due to reflection off the surface 128, and the second trapezoidal shape a result of reflected light from the more distant surface 130. The separation of the centers is 1.75 ns, leaving an overlap of ¼ of the tailing edge of the first pulse due to surface 128 with ¼ of the leading edge of the second pulse due to surface 130. The sum of the two ¼ level overlapping responses results in a ½ level dip between the two emergent trapezoidal features of response pulse 144. Reflected pulse 142 returns to detector pixels 7-9 in the rightmost column of the 3×3 zone of detector array 66, with a leading edge 8 ns later than the leading edge of reflected pulse 140. Since both surface 128 and 130 are orthogonal to the direction of the illuminating pulse, no change in width of the top levels is observed, and the stairstepped shape may be inferred by the data reduction processor 60 operating in concert with the scene processor 52.

Figure 11:
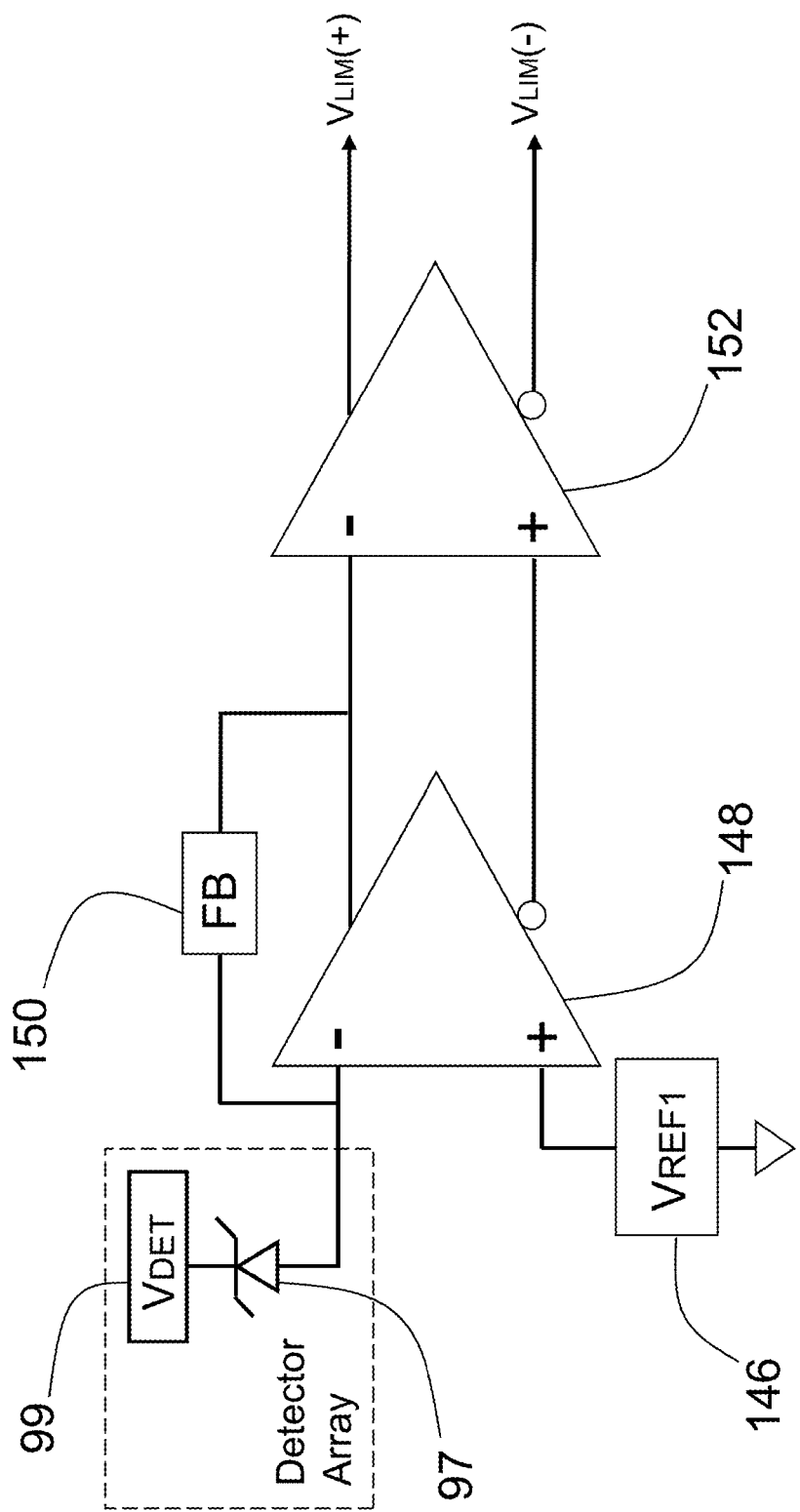
FIG. 11 is a schematic diagram of a unit cell input amplifier structure which is capable of amplifying the low level current signal received from an element of the detector array and having the ability to also preserve the pulse shape with sufficient detail to allow for later sub-pixel resolution enhancement from a detailed analysis of the returned pulse shape.

FIG. 11 shows the structure of input amplifier 96 of the unit cell electrical circuit. A difference amplifier 148 has a programmable voltage reference ($V_{REF1}$) connected to a non-inverting (+) input. The inverting (−) input of difference amplifier 148 is connected to the anode of an APD detector element 97 of detector array 66. The cathode of APD detector element 97 is connected to a programmable detector bias voltage generator 99 ($V_{DET}$). The inverting (−) input of difference amplifier 148 also connects to a feedback circuit 150 which may be a resistor, or may be a transistor configured as a variable resistance, or may also contain frequency selective elements such as capacitors connected in parallel, and/or small inductors connected in series. The second terminal of the feedback circuit connects to the non-inverting output of difference amplifier 148. This configuration is often termed a transimpedance amplifier when the feedback circuit 150 is a resistor, and is well suited to API) or PIN diode inputs, which resemble current sources in some respects. Use of a difference amplifier in this case provides a low noise response at low input signal levels, white at the same time compressing gracefully when subjected to high level input signals as is often the case with highly reflective objects (stop signs) positioned in the near field of short range sensor 22. A second difference amplifier 152 with a fixed gain is cascaded to provide additional dynamic range. Typical values for transimpedance gain are in the range of 50-250 kohms, depending on the pulse widths chosen for the illuminating pulses, and may be programmable in some embodiments. Typical values of voltage gain for second difference amplifier 152 are in the range of 10-50, and again may be programmable in some embodiments. The configuration of second difference amplifier 152 is inverting, with a non inverting (+) input connected to the inverting output of first difference amplifier 148. The inverting (−) input of second difference amplifier is connected to the non-inverting output of first difference amplifier 148. The two cascaded inverting stages give a differential output having the same sense as the input optical pulse detected by detector element 97 at non-inverting output $V_{LIM}$(+). A third differential stage may be used to extend dynamic range even further in alternative embodiments, and the number of cascaded stages may be extended indefinitely with some limitations imposed by the nature of integrated circuits. One major limitation is the difficulty of isolating input from output, preventing regeneration. A second limitation on gain, again imposed by the limited isolation achievable in an integrated circuit process, occurs between neighboring unit cell electrical circuits. Unit cell gain must therefore be limited to keep low level signals parasitically coupled from a brightly illuminated adjacent unit cell, from interfering with the low level input signal from individual detector element 97.

Figure 12:
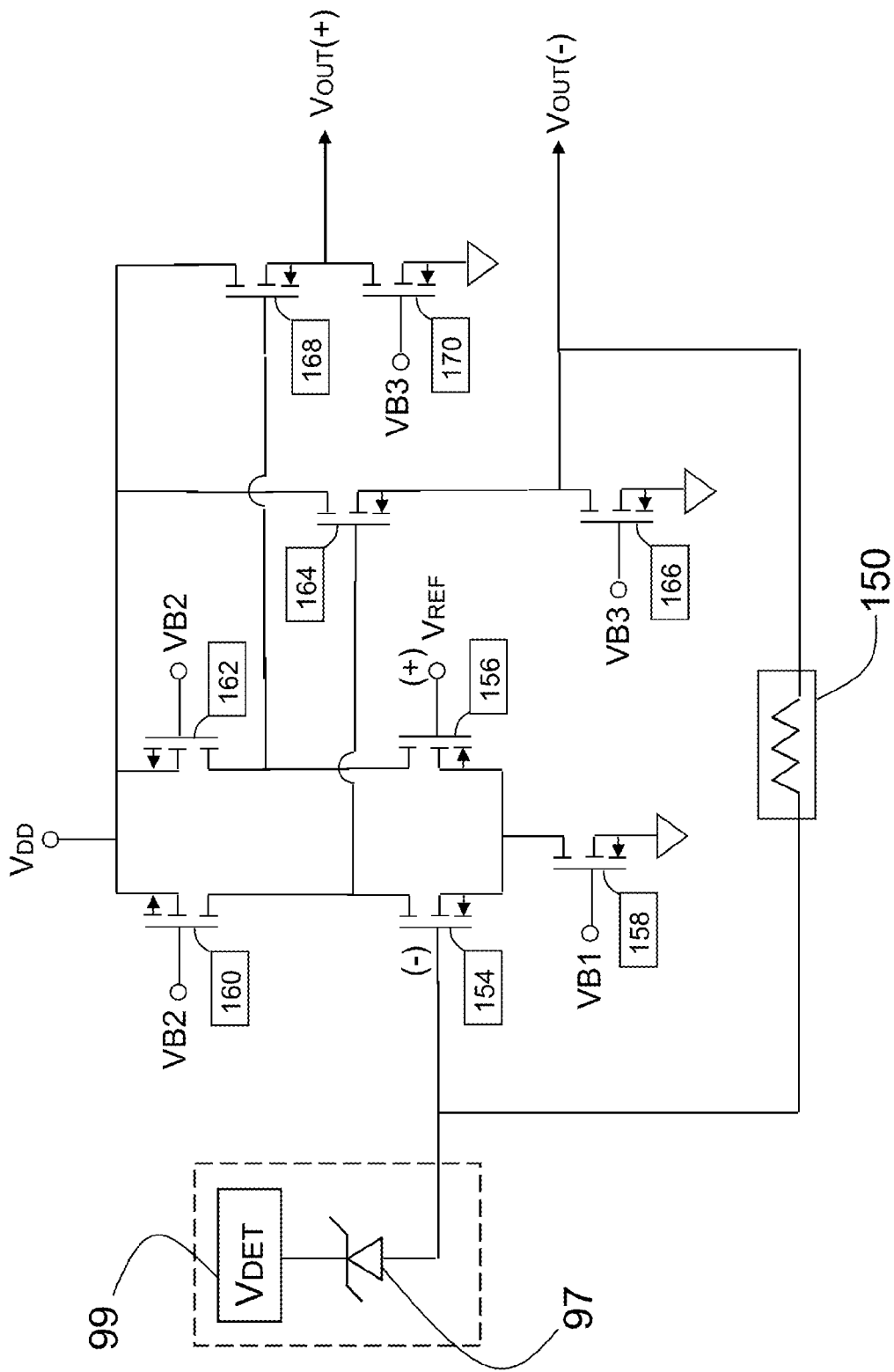
FIG. 12 is a detailed transistor level schematic diagram of a differential amplifier useful as the core of a transimpedance amplifier designed to boost the low level signal current from an element of the detector array, and which may also serve as a limiting amplifier with fixed or variable gain.

FIG. 12 is a detailed electrical schematic of the difference amplifier 148 of FIG. 11. The preferred embodiment utilizes an n-channel MOS transistor 154 with the gate as the inverting input. The gate of a matching n-channel MOS transistor 156 is the non-inverting input, and the source terminal of NMOS transistor 156 is connected to the source terminal of NMOS transistor 154, completing the differential pair. A third NMOS transistor 158 has the drain terminal connected to the common junction of NMOS transistor 154 source and NMOS transistor 156 source. The gate of NMOS transistor 158 is connected to programmable voltage bias VB1. The source of NMOS transistor 158 is connected to circuit ground, and the transistor behaves in this circuit as a programmable high value load resistance, completing the differential amplifier. Connected in like manner as a high value pull-up resistance is p-channel MOS transistor 160, with the drain connected to the drain terminal of NMOS transistor 154. The gate of PMOS transistor 160 is connected to a programmable voltage bias VB2, which sets the value of the variable resistance between the source and drain of PMOS transistor 160. The source terminal of PMOS transistor 160 is connected to the positive voltage supply VDD, and the value of the variable resistance in the channel of PMOS transistor 160 is set by the difference between VB2 and VDD. PMOS transistor 162 is connected to the drain of NMOS transistor 156, and performs in an identical manner as PMOS transistor 160, as a voltage programmable pull-up resistance for NMOS transistor 156 of the differential pair. NMOS transistor 164 is configured as a unity gain buffer amplifier in the familiar source-follower topology. The gate of NMOS transistor 164 is connected to the drain of NMOS transistor 154, the inverting output of the differential pair. The drain of NMOS transistor 164 is connected to the positive voltage supply VDD, and the source connected to the drain of NMOS transistor 166 which is again connected as a high value programmable load resistance, completing the unity gain buffer amplifier circuit. The source terminal of NMOS transistor 166 is connected to circuit ground. The gate of NMOS transistor 166 is connected to a third programmable voltage bias VB3, which sets the resistance in the channel between the source and drain of NMOS transistor 166. NMOS transistors 168 and 170 are likewise connected to the non-inverting differential amplifier output as a unity gain voltage buffer amplifier, operating in like manner to NMOS transistors 164 and 166. Feedback impedance in this case is a resistance 150 connected between the buffered inverting output, and the gate of the inverting input transistor 154. The feedback impedance may alternatively be connected directly between the gate and drain of NMOS transistor 154 depending on a number of other design considerations.

Figure 13:
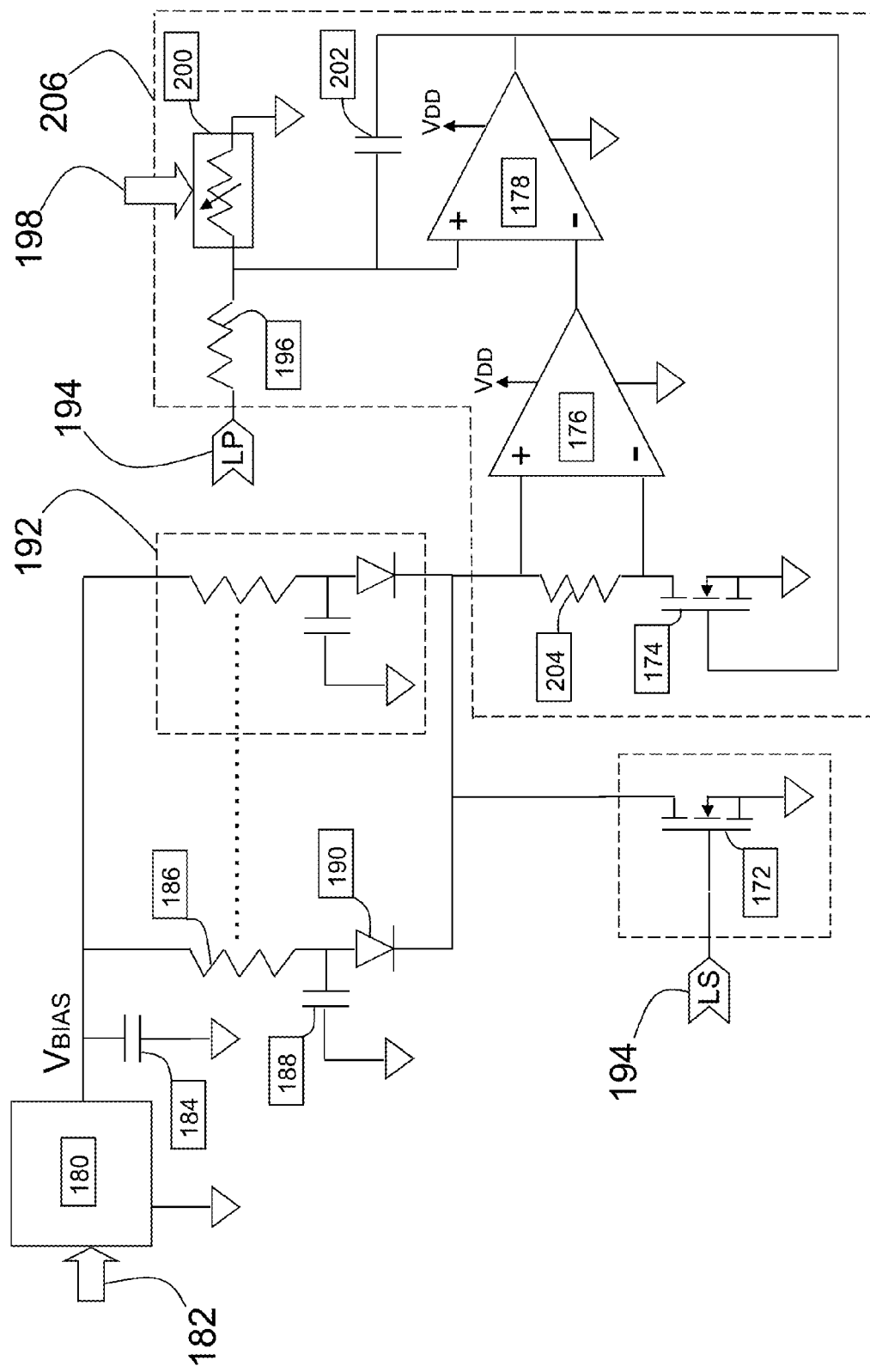
FIG. 13 is a schematic diagram of a pre-bias and pulse drive circuit for a semiconductor laser which may be used as a pulsed illuminating source.

FIG. 13 is the electrical schematic for a semiconductor laser driver suitable for producing high power and short duration laser pulses suitable for the pulsed laser transmitter 72 of FIG. 5. It is also possible to use the circuit as an analog modulator. A first NMOS transistor 172 is connected so as create a current through laser diode 190. The gate of NMOS transistor 172 is driven by a logic signal LS 194 which is generated upon command from control processor 74. Logic signal LS is a low power logic signal which may be a single digital pulse, a series of digital pulses, or an analog modulation waveform. For a logic level signal, NMOS transistor turns on fully, and the channel impedance from drain to source is at a minimum. The amount of current conducted through laser diode 190 depends on the curve of transistor 172, the series resistance of laser diode 190, the value of limiting resistor 186, and the initial bias voltage VBIAS, generated by the programmable voltage source 180. In the case of a digital modulation sequence, LS is a high enough voltage level which will cause NMOS transistor 172 to conduct with minimum resistance in the channel between source and drain terminals. The cathode of laser diode 190 is connected to the drain of NMOS transistor 172. The anode of laser diode 190 is connected to a local storage capacitor 188, and to a fuse 186. The value of local storage capacitor is chosen to enable a fast rise time through laser diode 190 at the initial application of the logic signal LS. The value of global storage capacitor 184 is typically chosen so as to deliver all the energy needed during a pulse sequence, and the source impedance of bias generator 180 selected to be able to replenish global storage capacitor in the time between pulse sequences. Fuse 186 is designed to ensure there is no thermal runaway within a failed laser diode 190 which could short out the entire array of diodes. This fuse 186 is typically not required for VCSEL arrays, due to their inherent resistance to thermal runaway, but is nonetheless included as an additional circuit protection. Fuse 186 is shown in the schematic as a low value resistance, as it may be realized on a circuit card or ceramic circuit substrate in the form of a printed resistor. Programmable voltage source 180 is adjusted by a set of digital inputs 182 from control processor 74. The laser diode structure shown within dashed line boundary 192 of laser diode 190, local storage capacitor 188, and fuse 186 may be repeated as often as needed to yield the required power. Likewise, the NMOS modulating transistors may be wired in parallel, to yield the required current necessary for the size of the laser diode array. The circuit within dashed line boundary 206 is a pre-bias circuit, which may be eliminated in some purely digital designs, or may alternatively be used as an analog modulator circuit. The primary use of the pre-bias circuit 206 is to eliminate turn-on delays associated with some laser diodes as they transition from zero bias through a square law regime associated with LED operation, and into a more linear region associated with the initiation of a lasing mode within the cavity. The pre-bias input LP 194 may initially be at or near zero, prior to a pre-trigger signal LP being applied. In the case of digital modulation, LP is a switched logic level, and the amount of pre-bias is set by the voltage divider between fixed resistor 196 and programmable resistor 200. Programmable resistor 200 is set by digital logic inputs 198 at start-up and may be adjusted or refreshed between laser pulse sequences. Since there is initially no current flowing through sense resistor 204, error amplifier 178 will begin integrating higher at a rate determined by the output impedance of error amplifier 178 and the value of capacitor 202. As the output voltage of error amplifier 178 increases, the gate NMOS transistor 174 which is connected to this output will slowly turn NMOS transistor 174 on. As NMOS transistor turns on, current begins flowing through current sense resistor 204, which is then buffered through a unity gain stage 176, and the output voltage applied to the inverting input of error amplifier 178, which completes the feedback loop. In steady state conditions, the current through sense resistor 204 times the value of resistor 204 is controlled by error amplifier 178 to be the same as the voltage present at the (+) input of error amplifier 178. Alternatively, a time-varying signal may be presented at the pre-bias input LP 194, and the laser diode array modulated in an analog fashion. The value of capacitor 202 may be adjusted automatically by realizing capacitor 202 as an array of switched capacitors connected in parallel in the feedback loop of error amplifier 178 (these are not shown). A number of additional NMOS transistors 174 may be connected in parallel as well, depending on the size of the laser diode array being driven.

Figure 14:
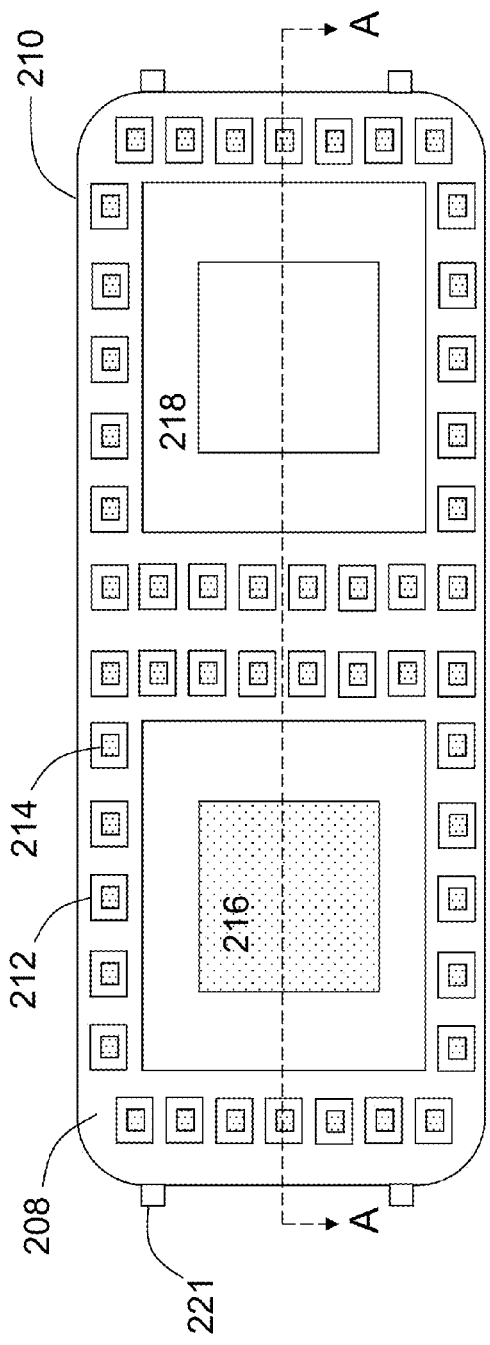
FIG. 14 is a plan view of a low cost auxiliary ladar sensor assembly embodying many of the features described herein.

FIG. 14 is a top or plan view of the auxiliary ladar sensor assembly 208 which may be mounted to a vehicle 2 embedded within a tail light, brake light, or turn signal assembly, or alternatively as a dedicated auxiliary sensor embedded in a door panel, roof column, or bumper zone of the vehicle 2. A durable molded plastic envelope 210 encloses the assembly, which has features for both retention and connection to the electrical systems and controls of vehicle 2. In the embodiments of the auxiliary ladar sensor which incorporate signal lights into the assembly, a number of light emitting diode (LED) chips 212 are arranged in a pattern within the assembly designed to produce the desired visibility or illumination in concert with an appropriate diffusing lens or diffractive element 240, shown in this instance as an array of diffractive elements in FIG. 15. Each LED has an active area 214 from which light emits upon application of an electric current. A diffusing lens or diffractive array 216 is incorporated into the envelope 210 shown here and also in FIG. 15 above a solid state laser 226. A light collecting and focusing lens element 218 is shown here incorporated into a transparent plastic envelope 210. Retention features 220 and 221, here shown as ramps or snaps, are integrally formed with envelope 210, and are used to secure the auxiliary ladar sensor 208 within a cutout in a vehicle 2 body panel. The body panel cutouts are shaped to receive and securely retain retention features 220. A section line AA is drawn through the assembly and illustrated in FIG. 15 showing greater details of the internal workings.

Figure 15:
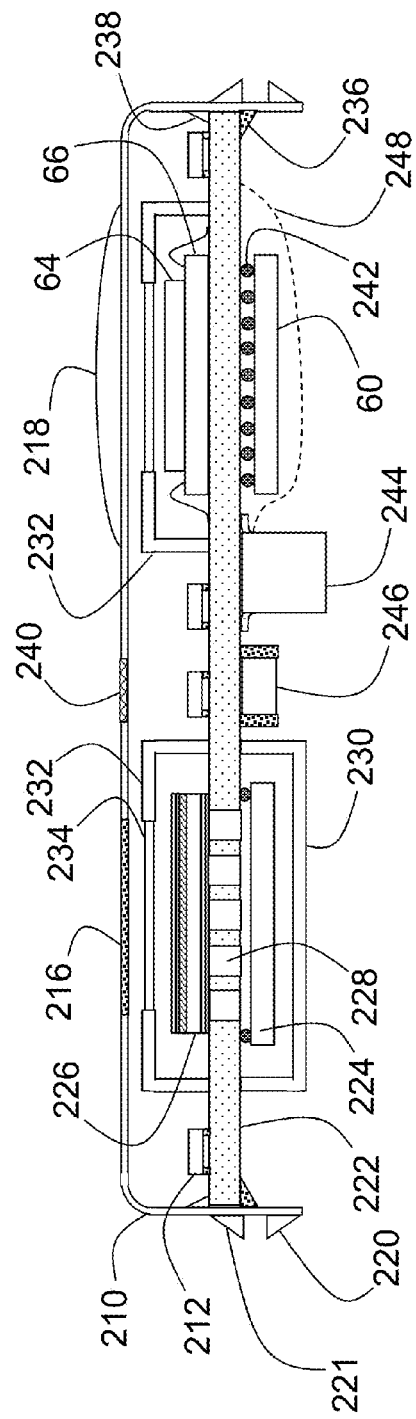
FIG. 15 is a side view of a section along line AA of the device described in FIG. 14, and showing enhanced details of the features of the low cost auxiliary ladar sensor assembly.

FIG. 15 shows a number of important features of the auxiliary ladar sensor 208 illustrated in FIG. 14. Envelope 210 both encloses the circuit assembly and may perform as a diffuser in diffusing light from LED chips 212 and solid state laser 226. A number of diffusing structures 240 may be embossed, molded, or otherwise formed to aid in the direction and diffusion of signaling and illuminating light emanating from LED chips 212. Likewise, a diffusing structure 216 may be embossed, molded, or otherwise formed above solid state laser 226 to aid in directing and diffusing pulsed laser light into the surrounding environs. Envelope 210 also has internal wedge shaped bosses 238 integrally molded on an interior surface to act as stops for the mounting of circuit substrate 222. In this instance, circuit substrate 222 is an aluminum nitride thick film ceramic circuit, though a PC board, plastic molded, steel/porcelain, or other ceramic substrate may be used in the alternative. LED chips 212 are attached to an upper surface using solder balls. A solid state laser 226 formed in the shape of a disc is mounted to an upper surface of circuit substrate 222 using solder or heat conductive epoxy. In this case solid state laser 226 is a four layer sandwich with a bottom layer attached to circuit substrate 222. The first (bottom) layer is a dielectric mirror in this case consisting of alternating layers of optical grade materials having contrasting indices of refraction. The mirror must be transmissive at the pump wavelength of 976 nanometers and reflective at the lasing wavelength of 1540 nm. The second (white) layer is the active gain medium, in this design erbium doped phosphate glass, though other erbium doped glasses, neodymium-YAG, or other suitable crystal may be employed. The third layer is a q-switch material of a saturable absorber which bleaches at a specified threshold power level. The fourth (top) layer is a mirror surface which may be a dielectric mirror similar to the first layer, or may be a metallic reflector. In either case, it should reflect both the pump light wavelength at 976 nanometers and the lasing wavelength of 1540 nm. A series of circular openings 228 are formed in circuit substrate 222 which allow for the light from the pump laser 224 to pass through the substrate. Pump laser 224 in this embodiment is a rectangular array of 976 nanometer VCSELs which emit vertically. The pump laser diode array 224 is attached to circuit substrate 222 by solder balls which are reflowed during the conventional flip-chip circuit assembly process. An optional hermetic cover 230 made of Covar® or other suitable metal, plated for solderability, is also soldered or brazed to the bottom side of circuit substrate 222 to hermetically seal both the pump laser array 224 and the solid state laser assembly 226 from the environment. In the case where solid state laser 226 is attached by solder to circuit substrate 222, a metallization must be placed on the underside of the chip, typically a titanium/nickel/gold scheme which is applied during successive physical vapor deposition (PVD) coating sequences. Openings in this metallization must be provided for, typically accomplished by photolithography, to allow pump light from pump laser array 224 to illuminate the active region of solid state laser 226. Over the top of solid state laser 226 is a hermetic window cover 232, typically made of Covar® or other suitable metal, plated for solderability, and soldered or brazed to the top side of circuit substrate 222. A transparent window 234, making a hermetic glass to metal seal is assembled to the metal tub which forms the basis of the cover 232, prior to mounting to the circuit substrate 222. Transparent window 234 may also be a lens, lens array, or array of diffractive elements. At the right of FIG. 15, ROIC 64 is mounted to circuit substrate 222 by solder or conductive epoxy. A detector array 66 is mounted atop ROIC 64 by indium bumps or solder balls, reflowed by the appropriate process. Wirebonds extend laterally from ROIC 64 and are wedge bonded to pads at the surface of circuit substrate 222. Typically, wirebonds are gold wire and the bonding pads gold over other metal conductor, though other material systems may be used. A second hermetic cover 232 is mounted over the hybrid assembly of ROIC 64 and detector array 66 which also has a transparent window glass 234 mounted therein. Transparent window glass 234 may also be a refractive or diffractive focusing element. Data reduction processor 60 is flip chip soldered directly beneath ROIC 64 on an opposing side of circuit substrate 222, making electrical connections through circuit substrate 222. Solder balls 242 are reflowed during the assembly of circuit substrate 222. A storage capacitor 246 stores enough energy to fire a pulse from solid state laser 226. A connector 244 receives a mating connector from the fiber cable and wire harness 48 connected to an intermediate ladar system controller 24 or directly to the vehicle 2 electrical systems 28 in some designs. The connector 244 may have electrical contacts for receiving electrical power and ground from vehicle 2. Other electrical contacts in connector 244 may be used for bidirectional transfer of data, control, and status signals. Connector 244 may also have optical mating surfaces for bidirectional transfer of optical data, control, and status signals over wiring harness 48. An optional epoxy dome 248 may be applied over data reduction processor 60 and any other exposed electrical connections on circuit assembly 222, at any time subsequent to the final soldering operations. Additionally, an epoxy fillet 236 is applied to secure circuit substrate 222 and the assembly thereon, to envelope 210. The forming of epoxy fillet 236 may be eliminated in favor of staking, plastic reflowing, or other methods of securing circuit substrate 222 to envelope 210. Retention features 220 are shown here in a side vide which illustrates the ramped section of plastic molded beams projecting inward which will deflect upon insertion in the mating body panel cutout, and then spring back once the thickness of the panel is cleared. The outer surface of the vehicle 2 body panel will then rest securely against a panel stop 221, which is integrally formed with retention features 220, and effectively sets the depth of insertion of the ladar sensor assembly 208.

FIG. 16 is a plan view similar to FIG. 14, with noted exceptions of an alternative embodiment of auxiliary ladar sensor assembly 208 employing an electronically modulated VCSEL array 224 as the pulsed laser transmitter. Improved lower inductance and more reliable flexible circuit connections are also used to electrically connect both ROIC 64 and detector array 66. In this drawing, the envelope 210 is unmodified, and has been removed to better expose the inner workings of this alternative embodiment. Circuit substrate 222 is seen supporting an array of signaling or illuminating LEDs 212. A section line BB is drawn through the assembly and illustrated in FIG. 15 showing greater details of the internal workings.

FIG. 17 shows a number of features along line BB of the circuit assembly shown in FIG. 16, and exposes additional details. An array of lens elements 250 are secured in access bores 228 by epoxy, staking, or plastic reflow. The lens elements 250 may be glass, or plastic, and may have convex, concave, or planar geometry, and may have flat, circular, or be elliptical surfaces depending on the optical design requirements of the particular auxiliary ladar sensor installation. Hermetic window covers 232 are soldered in place as described above, and may have clear transparent windows, or may have refractive or diffractive lens elements formed thereon. Storage capacitor 248 is of a much greater capacity, due to the requirement for all the energy to be delivered during a few nanoseconds instead of the hundreds of microseconds in the case of an optically pumped gain medium as described with respect to FIGS. 14 and 15. A new mezzanine level circuit substrate 252 formed in the shape of a picture frame is mounted atop main circuit substrate 222 at the right of FIG. 17, and serves to make electrical connections to ROW 64 and detector array 66. Beam leads 254 are formed on a flexible circuit substrate of Mylar or Kapton and are connected with solder to ROIC 64. This type of circuitry is often referred to as rigid-flex, combining the features of a rigid PC board 252 with the advantages of flexible circuit connections 254. The picture frame shape allows the mezzanine PC board to fit over the rectangular ROIC 64 closely, making the connections as short as possible, thus lowering inductive bounce from a plurality of output drivers, and lowering the impedance of ground and power connections at the higher frequencies characteristic of high performance circuits. Higher accuracy range estimations typically result from increased sampling rates, and therefore the lower parasitic inductance packaging utilizing the mezzanine picture frame approach should yield major improvements in performance as clock rates and sampling rates move ever higher. The mezzanine PC 252 may be secured to main circuit substrate 222 by a thin layer of epoxy and by a number of gold plated beryllium copper pins 253 which are staked through large diameter vias (shown as dashed lines) in mezzanine PC 252 and through mating vias formed in main circuit substrate 222. The vias, represented here as a dashed line column, typically connect with an internal ground plane on main circuit substrate 222, and are soldered both at the top of mezzanine PC 252, and at the bottom of main circuit substrate 222. Other connections between mezzanine PC 252 and main circuit substrate 222 may be through solder bumps, beam leads, plated through vias, or edge plating on mezzanine PC 252. The preferred material for mezzanine PC 252 is FR-4, but other circuit materials may be used with the same effect. Beam leads 256 connecting to the top of detector array 66 may be as simple as a thin sheet of gold plated beryllium copper, since the top connection to the detector array is typically only one line, a high voltage detector bias. In the simple case, beams leads 256 comprising one or more beryllium copper sheets are attached after mezzanine PC 252 is secured and connected, by soldering to the top of mezzanine PC 252, and by conductive epoxy or low temperature solder to a detector bias voltage grid connection atop detector array 66. In embodiments which require a greater number of connections, beam leads 256 may be another flex circuit attached by soldering to the top of mezzanine PC 252, and by conductive epoxy or low temperature solder to a number of metallic pads atop detector array 66.

FIG. 18 is a diagram showing the mating of detector array 66 with readout IC 64. Row amplifiers 258 and column amplifiers 264 allow the output from a unit cell electrical circuit 260 to be output as part of a row output or column output read cycle. All signals to and from readout IC 64 are communicated through bond pads 266 at the periphery of the ROIC 64. FIG. 19 shows details of the placement of the indium bump 262 atop each unit cell electrical circuit 260 which is then compressed and deformed under temperature and pressure as part of the bonding process which mates detector array 66 to readout IC 64. The indium bump 262 may instead be a low temperature solder bump, which may be reflowed to permanently bond detector array 66 to readout IC 64. The arrow shows the direction of mating, and the top of detector array 66 shows the grid pattern of an optional micro lens array comprised of tens elements 268 which collect and focus light into each of the individual detector elements of detector array 66 formed on the anterior surface.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A collision avoidance system comprising:
a vehicle having at least one ladar sensor mounted thereto, the vehicle having a cutout in a body panel, the cutout having a shape adapted to receive and engage a retention feature on the one ladar sensor, and the vehicle also having a first digital processor connected to a wiring harness, a first connector attached at a terminus of said wiring harness, said first connector adapted to mate with a connector of the one ladar sensor, and the first digital processor receiving three dimensional data from the ladar sensor through the wiring harness, and a control system which controls the path of said vehicle, said first digital processor applying controls through said control system to conduct the vehicle along a preferred path;
and the ladar sensor comprising
a receiving lens,
a laser transmitter, said laser transmitter with a modulated laser light output and a diffusing optic adapted to illuminate a scene in a field of view of said at least one ladar sensor, an automatic range correction circuit having a zero range reference output, a two dimensional array of light sensitive detectors positioned at a focal plane of said receiving tens, each of said light sensitive detectors with an output adapted to produce an electrical response signal from a reflected portion of said modulated laser light output, a readout integrated circuit with a plurality of unit cell electrical circuits, each of the unit cell electrical circuits having an input connected to one of the light sensitive detector outputs, each unit cell electrical circuit having an electrical response signal demodulator and a range measuring circuit connected to an output of said electrical response signal demodulator, said range measuring circuit further connected to the zero range reference output, and a detector bias circuit connected to at least one voltage distribution grid of said array of light sensitive detectors;

a second digital processor connected to receive data outputs from the range measuring circuits and adapted to conduct operations on said data outputs, and to provide digital outputs to said first digital processor, and a temperature stabilized frequency reference connected to the second digital processor.

2. The collision avoidance system of claim 1 wherein said laser transmitter comprises a semiconductor laser formed in a semiconducting gain medium with at least one element selected from the set of indium, gallium, arsenic, phosphorus.

3. The collision avoidance system of claim 1 wherein said modulated laser light output is modulated with a waveform selected from the set of a single Gaussian puke profile, multiple Gaussian profile pulses, a single flat-topped pulse profile, multiple flat-topped pulses, a puked sinewave, and a chirped sinewave pulse.

4. The collision avoidance system of claim 1 wherein said laser transmitter comprises an optically pumped solid state laser formed in a gain medium selected from the set of yttrium aluminum garnet, erbium doped glass, neodymium doped yttrium aluminum garnet, and erbium doped yttrium aluminum garnet.

5. The collision avoidance system of claim 1 wherein said two dimensional array of light sensitive detectors is mounted directly to said readout integrated circuit.

6. The collision avoidance system of claim 1 wherein said control system controls a vehicle system selected from the set of steering, braking, and suspension.

7. The collision avoidance system of claim 1 wherein said two dimensional array of light sensitive detectors is formed in a semiconducting film having an element selected from the set of silicon, indium, gallium, arsenic, phosphorus, aluminum, boron, antimony, magnesium, germanium and nitrogen.

8. The collision avoidance system of claim 1 wherein said ladar sensor is integral with an auxiliary lamp assembly selected from the set of a turn signal, taillight, parking light, and brake light.

9. The collision avoidance system of claim 1 wherein said electrical response signal demodulator comprises:

an input amplifier with an output connected to a trigger circuit;

a series of analog sampling gates, each sampling gate with an associated analog memory cell, and each of said sampling gates connected to an output of said input amplifier, a sample clock controlling the timing of each of said sampling gates, a selector for selecting each of said sampling gates in sequence, a counter for counting the number of samples, an output amplifier with an input connected to each of said analog memory cells, an output control for selecting a sequence of said analog memory cell contents to be output through said output amplifier, and wherein an input of an analog to digital converter is connected to said output amplifier, an output of said analog to digital converter is connected to an input of a digital processor and said analog to digital converter produces a sequence of digitized analog samples of said electrical response signal, and said digital processor is programmed to demodulate said electrical response signal by operating on the sequence of digitized analog samples using a digital processing algorithm.

10. The apparatus of claim 1 wherein said electrical response signal demodulator comprises:

an input amplifier with an output connected to a first input of a phase comparator, the phase comparator having a phase reference signal connected to a second input, and an output of the phase comparator connected to the input of an integrator, the integrator having an integrator output with an output voltage indicative of the difference in phase between the first input and the second input of said phase comparator.

11. The collision avoidance system of claim 1 wherein the vehicle further has at least one two dimensional imaging camera sighted to have a field of view overlapping the field of view of the ladar sensor assembly, and the vehicle further having a digital processor adapted to merge data from the ladar sensor with data from said two dimensional imaging camera.

12. A ladar sensor and vehicle comprising:

a vehicle having a cutout in a body panel, said cutout having a shape adapted to receive a mating retention feature, said vehicle further having a first digital processor, a wiring harness and a first connector attached at a terminus of said wiring harness, a ladar sensor comprising;

a second connector adapted to mate with the first connector of said wiring harness, receiving optics, a laser transmitter with a modulated laser light output and a diffusing optic adapted to illuminate a scene in a field of view of said ladar sensor, an automatic range correction circuit having a zero range reference output, a two dimensional array of light sensitive detectors positioned at a focal plane of said receiving optics, each of the light sensitive detectors with an output producing an electrical response signal from a reflected portion of the modulated laser light output, a readout integrated circuit with a plurality of unit cell electrical circuits, each of said unit cell electrical circuits having an input connected to one of the light sensitive detector outputs, each unit cell electrical circuit having an electrical response signal demodulator and a range measuring circuit connected to an output of said electrical response signal demodulator, said range measuring circuit further connected to the zero range reference output, a detector bias circuit connected to at least one voltage distribution grid of the array of light sensitive detectors, a second digital processor connected to receive outputs from the range measuring circuits, and a temperature stabilized frequency reference connected to the second digital processor; and, an envelope enclosing the ladar sensor, said envelope having at least one transparent section, and said envelope also having the mating retention feature and mounted to the vehicle.

13. The ladar sensor and vehicle of claim 12 wherein said wiring harness has at least one optical waveguide.

14. The ladar sensor and vehicle of claim 12 wherein said first connector has electrical contacts.

15. The ladar sensor and vehicle of claim 12 wherein said first connector has at least one optical mating surface.

16. The ladar sensor assembly and vehicle of claim 12 wherein said envelope is molded from a transparent plastic.

17. The ladar sensor and vehicle of claim 12 wherein said retention features are comprised of beams with tapered ramps which deflect upon engagement with a body panel cutout of a vehicle and spring back towards a rest position, thereby retaining the ladar sensor within the cutout when fully inserted into said panel.

18. The ladar sensor and vehicle of claim 12 wherein said laser transmitter comprises a vertical cavity surface emitting laser formed in a semiconducting gain medium with at least one element selected from the set of indium, gallium, arsenic, phosphorus.

19. The ladar sensor and vehicle of claim 12 wherein said modulated laser light output is modulated with a waveform selected from the set of a single Gaussian pulse profile, multiple Gaussian profile pulses, a single flat-topped pulse profile, multiple flat-topped pulses, a pulsed sinewave, and a chirped sinewave pulse.

20. The ladar sensor and vehicle of claim 12 wherein the laser transmitter comprises an optically pumped solid state laser formed in a gain medium selected from the set of yttrium aluminum garnet, erbium doped glass, neodymium doped yttrium aluminum garnet, and erbium doped yttrium aluminum garnet.

21. The ladar sensor and vehicle of claim 12 wherein the two dimensional array of light sensitive detectors is mounted directly to said readout integrated circuit.

22. The ladar sensor and vehicle of claim 12 wherein said ladar sensor comprises a plurality of electrical components mounted to at least one circuit substrate within said envelope.

23. The ladar sensor and vehicle of claim 12 wherein said ladar sensor is integrated into an auxiliary lamp assembly selected from the set of a turn signal, taillight, parking light, mirror assembly, and brake light.

24. The ladar sensor and vehicle of claim 12 wherein said vehicle further has at least one two dimensional imaging camera sighted to have a field of view overlapping said field of view of said ladar sensor, and said vehicle further having a digital processor adapted to merge the data from said ladar sensor with data from the two dimensional imaging camera.

25. The ladar sensor and vehicle of claim 12 wherein the laser transmitter is enclosed by a hermetic cover.

26. The ladar sensor and vehicle of claim 12 wherein said two dimensional array of light sensitive detectors is enclosed by a hermetic cover.

27. The ladar sensor and vehicle of claim 12 wherein said laser transmitter is an array of semiconductor lasers modulated by a current controlled by at least one transistor.

* * * * *